United States Patent
Toeroe et al.

(10) Patent No.: US 11,558,248 B2
(45) Date of Patent: Jan. 17, 2023

(54) DIMENSIONING NETWORK SERVICES (NS)

(71) Applicants: Maria Toeroe, Montreal (CA); Navid Nazarzadeoghaz, Montreal (CA); Ferhat Khendek, Montreal (CA)

(72) Inventors: Maria Toeroe, Montreal (CA); Navid Nazarzadeoghaz, Montreal (CA); Ferhat Khendek, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 15 days.

(21) Appl. No.: 17/291,950

(22) PCT Filed: Nov. 6, 2019

(86) PCT No.: PCT/IB2019/059549
§ 371 (c)(1),
(2) Date: May 6, 2021

(87) PCT Pub. No.: WO2020/095232
PCT Pub. Date: May 14, 2020

(65) Prior Publication Data
US 2022/0006693 A1 Jan. 6, 2022

Related U.S. Application Data

(60) Provisional application No. 62/757,319, filed on Nov. 8, 2018.

(51) Int. Cl.
*H04L 41/0806* (2022.01)
*H04L 41/0893* (2022.01)
(Continued)

(52) U.S. Cl.
CPC ...... *H04L 41/0806* (2013.01); *H04L 41/0893* (2013.01); *H04L 41/40* (2022.05); *H04L 41/5048* (2013.01); *H04L 41/5051* (2013.01)

(58) Field of Classification Search
CPC ............ H04L 41/0806; H04L 41/0893; H04L 41/5048; H04L 41/5051; H04L 41/0895; H04L 41/40
See application file for complete search history.

(56) References Cited

U.S. PATENT DOCUMENTS

2015/0365352 A1* 12/2015 Xiang .............. H04L 67/10
                                                          709/226
2018/0077020 A1* 3/2018 Li .................. H04L 41/5054
(Continued)

FOREIGN PATENT DOCUMENTS

| JP | 6947129 B2 * | 10/2021 | ............ H04L 41/22 |
| WO | 2018/200570 A1 | 11/2018 | |
| WO | 2018/219479 A1 | 12/2018 | |

OTHER PUBLICATIONS

ETSI, Network Functions Virtualisation (NFV) Release 3 Management and Orchestration Network Service Templates Specification, Aug. 2018 (Year: 2018).*
(Continued)

*Primary Examiner* — John A Follansbee
*Assistant Examiner* — Fadi Haj Said
(74) *Attorney, Agent, or Firm* — Ericsson Canada Inc.; Julia Dufort

(57) ABSTRACT

A method and network node are provided for dimensioning a network service (NS). The method comprises calculating, based on given capacity requirements of the NS, a required number of virtual network functions component (VNFC) instances of each of a plurality of virtual network function (VNF) in the NS; selecting a VNF deployment flavor (VnfDf) for each of the plurality of VNFs in the NS, based on the calculated required number of VNFC instances; generating a network service deployment flavor (NsDf) including the selected VnfDfs; and onboarding a network service descriptor (NSD), which includes the NsDf, for use for instantiating the dimensioned NS.

13 Claims, 16 Drawing Sheets

(51) Int. Cl.
 *H04L 41/5041* (2022.01)
 *H04L 41/5051* (2022.01)
 *H04L 41/40* (2022.01)

(56) References Cited

U.S. PATENT DOCUMENTS

2020/0007413 A1* 1/2020 Kerpez ............... H04L 41/5058
2020/0014582 A1* 1/2020 Chou .................... H04W 28/18
2021/0367863 A1* 11/2021 Nakajima ............... H04L 41/22

OTHER PUBLICATIONS

Mustafiz, A Network Service Design and Deployment Process for NFV Systems, 2016, IEEE (Year: 2016).*
Draft ETSI, "Network Functions Virtualisation (NFV) Release 2; Protocols and Data Models; NFV descriptors based on TOSCA specification", GS NFV-SOL 001 V0.9.0 Jun. 2018, 150 pages.
ETSI GR NFV-IFA 015 v3.1.1. Network Functions Virtualisation (NFV) Release 3; Management and Orchestration; Report on NFV Information Model;Annex B: Word format presentation of the NFV Information Model, 2018, 86 pages.
S. Mustafiz et al.: "A Model-Driven Process Enactment Approach for Network Service Design"; 2017; 19 pages.
ETSI GS NFV-SWA 001 V1.1 1: "Network Functions Virtualisation (NFV); Virtual Network Functions Architecture"; Dec. 2014; 93 pages.
ETSI GS NFV-IFA 014 V3.1.2: "Network Functions Virtualisation (NFV) Release 3: Management and Orchestration"; Sep. 2018; 44 pages.
ETSI GS NFV-IFA 013 V3.1.1: "Network Functions Virtualisation (NFV) Release 3; Management and Orchestration; Os-Ma-Nfvo reference point—Interface and Information Model Specification"; Aug. 2018; 182 pages.
ETSI GS NFV-MAN 001 V1.1.1: "Network Functions Virtualisation (NFV); Management and Orchestration"; Dec. 2014; 184 pages.
M. Abbasipour et al.: "A Model-Based Approach for User Requirements Decomposition and Component Selection"; 2015; 30 pages.
International Search Report and Written Opinion for PCT/IB2019/059549, dated Jan. 14, 2020; 17 pages.

* cited by examiner

| VNFs \ vnfDf | VNF1 | | | | VNF2 | | | | VNF3 | | |
|---|---|---|---|---|---|---|---|---|---|---|---|
| | VNFC1 (R=9) | VNF. R=10 | VNF. R=8 | VNF1 | VNFC1 (R=12) | VNF. R=16 | VNF. R=12 | VNF2 | VNFC1 (R=7) | VNF. R=17 | VNF3 |
| Df 1 Int. Lvl 1 | 1 | [10/1]=10 | [8/1]=8 | 10,20 | 1 | [16/1]=16 | [12/1]=12 | 16,32 | 1 | [17/1]=7 | 7 |
| Int. Lvl 2 | 3 | [10/3]=4 | [8/3]=4 | 4,24 | 3 | [16/3]=6 | [12/3]=4 | 6,36 | 2 | [17/2]=4 | 8 |
| Int. Lvl 3 | 5 | [10/5]=2 | [8/5]=2 | 2,20 | 5 | [16/5]=4 | [12/5]=3 | 4,40 | 3 | [17/3]=3 | 9 |
| Df 2 Int. Lvl 1 | 7 | [10/7]=2 | [8/7]=2 | 2,28 | 7 | [16/7]=3 | [12/7]=2 | 3,42 | 4 | [17/4]=2 | 8 |
| Int. Lvl 2 | 9 | [10/9]=2 | [8/9]=1 | 2,36 | 9 | [16/9]=2 | [12/9]=2 | 2,38 | 5 | [17/5]=2 | 10 |
| Int. Lvl 3 | 11 | [10/11]=1 | [8/11]=1 | 1,22 | 11 | [16/11]=2 | [12/11]=2 | 2,44 | 6 | [17/6]=2 | 12 |

Table 3. Results for Dimensioning the VNFs

FIG. 10B

DIMENSIONING NETWORK SERVICES (NS)

PRIORITY STATEMENT UNDER 35 U.S.C. S.119(E) & 37 C.F.R. S.1.78

This non-provisional patent application claims priority based upon the prior U.S. provisional patent application entitled "GENERATING NETWORK SERVICE DEPLOYMENT FLAVOR TO SATISFY CAPACITY REQUIREMENTS", application number 62/757,319, filed Nov. 8, 2018, in the name of Toeroe et al.

TECHNICAL FIELD

The present disclosure relates to systems and methods for network service design.

BACKGROUND

Network Function Virtualization (NFV) is a new paradigm in the telecom and networks domain, which by utilizing virtualization techniques in cloud and software-defined network (SDN) enables the decoupling of software (applications) from the underlying hardware. By using general-purpose hardware infrastructure and network functions implemented, packaged and deployed as software (i.e. Virtualized Network Functions (VNFs)), the NFV architecture can provide the network service provisioning, management, and orchestration functions more efficiently.

The European Telecommunication Standard Institute (ETSI) is in charge of standardizing a complete framework for NFV. The framework consists of the management and orchestration (NFV-MANO) and virtualized infrastructure running the VNFs. The Operation and Business Support System (OSS/BSS) is the business brain of service providers' framework. The OSS/BSS relies on the NFV-MANO for the deployment and management of network services in the virtualized infrastructure. The NFV-MANO deploys and manages network services based on a network service deployment template, the Network Service Descriptor (NSD).

A network service is a composition of network functions (NF). To deploy a network service in the NFV system, the network service is described by an NSD which references to the VNF, physical network functions and nested network services composing the network service, the virtual links connecting them, and the VNF Forwarding Graphs with the different forwarding paths determining the packet flows through the virtual links. The NSD has been standardized by ETSI NFV in the NFV-IFA 014 specification. The OSS/BSS uses an NSD to onboard a network service. An NSD is generated based on high level network service requirements of a tenant who may specify functional and non-functional requirements.

SUMMARY

There is provided a method for providing a network service to satisfy given capacity requirements according to a network service design that includes a plurality of VNFs. The method comprises: calculating, based on the given capacity requirements, a required number of Virtual Network Functions Component (VNFC) instances of each VNF in the network service design; selecting a VNF deployment flavor based on the required number of VNFC instances; generating a network service deployment flavor including the selected VNF deployment flavor; and onboarding an NSD, which includes the network service deployment flavor, for instantiating the network service.

There is provided a network node comprising processing circuitry and memory. The memory stores instructions executable by the processing circuitry to provide a network service to satisfy given capacity requirements according to a network service design that includes a plurality of VNFs. The network node operative to: calculate, based on the given capacity requirements, a required number of VNFC instances of each VNF in the network service design; select a VNF deployment flavor based on the required number of VNFC instances; generate a network service deployment flavor including the selected VNF deployment flavor; and onboard an NSD, which includes the network service deployment flavor, for instantiating the network service.

Generating the network service deployment flavor may further comprise: designing propagation flows for the network service, wherein each propagation flow is an ordered sequence of VNF interfaces through which traffic related to a requested functionality plane passes within the network service; propagating non-functional requirements, which include the given capacity requirements, along the propagation flows; dimensioning each VNF based on the required number of VNFC instances of each VNF; and tailoring the network service deployment flavor to include a set of network service levels covering an entire range of a requested capacity.

There is provided a method for dimensioning a network service (NS), comprising: calculating, based on given capacity requirements of the NS, a required number of virtual network functions component (VNFC) instances of each of a plurality of virtual network function (VNF) in the NS; selecting a VNF deployment flavor (VnfDf) for each of the plurality of VNFs in the NS, based on the calculated required number of VNFC instances; generating a network service deployment flavor (NsDf) including the selected VnfDfs; and onboarding a network service descriptor (NSD), which includes the NsDf, for use for instantiating the dimensioned NS.

There is provided a network node for dimensioning a network service (NS) comprising processing circuits and a memory, the memory containing instructions executable by the processing circuits whereby the network node is operative to: calculate, based on given capacity requirements of the NS, a required number of virtual network functions component (VNFC) instances of each of a plurality of virtual network function (VNF) in the NS; select a VNF deployment flavor (VnfDf) for each of the plurality of VNFs in the NS, based on the calculated required number of VNFC instances; generate a network service deployment flavor (NsDf) including the selected VnfDfs; and onboard a network service descriptor (NSD), which includes the NsDf, for use for instantiating the dimensioned NS.

A non-transitory computer readable media having stored thereon instructions for dimensioning a network service (NS), the instructions comprising: calculating, based on given capacity requirements of the NS, a required number of virtual network functions component (VNFC) instances of each of a plurality of virtual network function (VNF) in the NS; selecting a VNF deployment flavor (VnfDf) for each of the plurality of VNFs in the NS, based on the calculated required number of VNFC instances; generating a network service deployment flavor (NsDf) including the selected VnfDfs; and onboarding a network service descriptor (NSD), which includes the NsDf, for use for instantiating the dimensioned NS.

The method and network node present improvements to the way network services are provided.

BRIEF DESCRIPTION OF THE DRAWINGS

FIG. 10B is a table illustrating results for dimensioning the VNFs.

DETAILED DESCRIPTION

Figure 1:
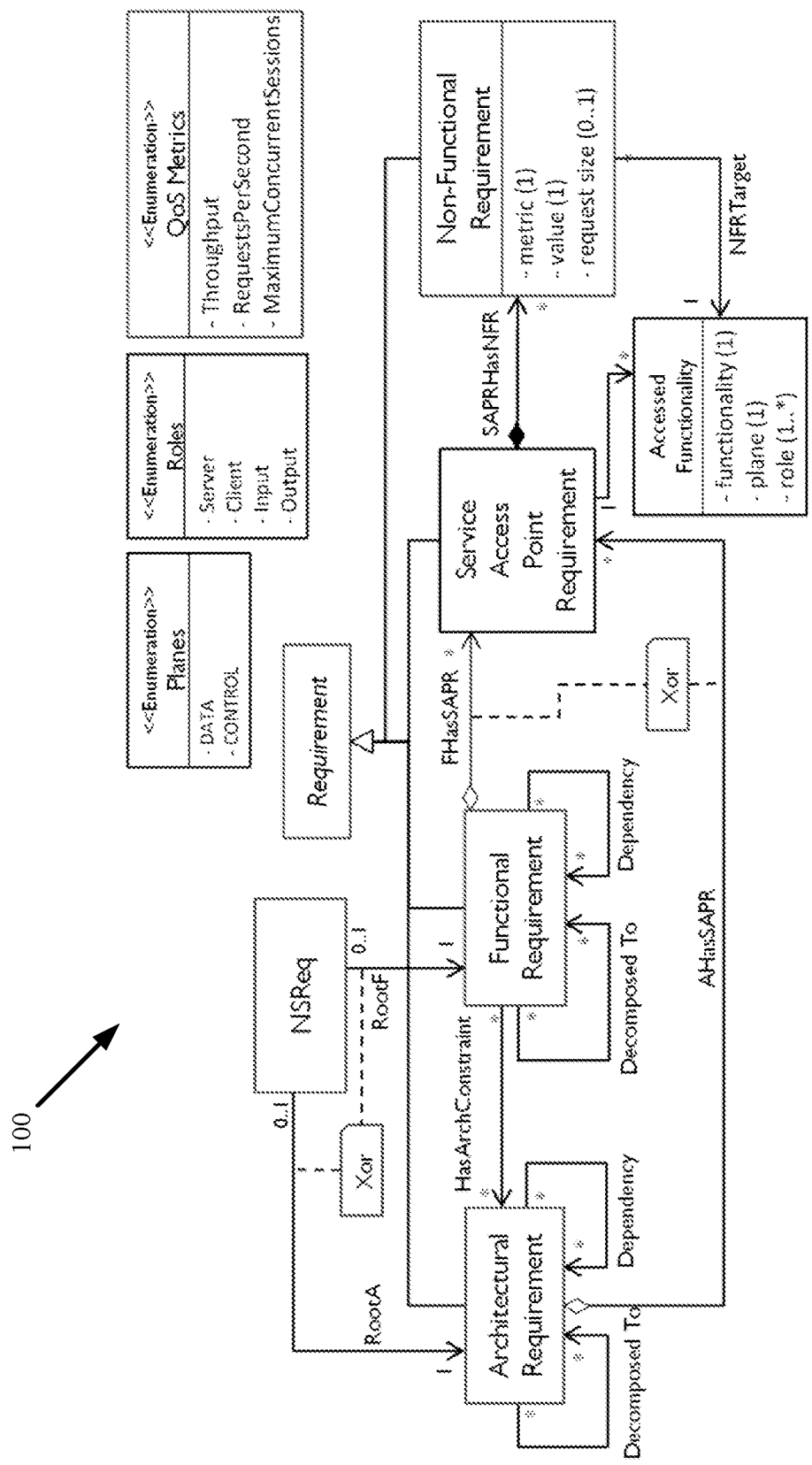
FIG. 1 illustrates an example Network Service Requirements (NSReq) meta-model.

Various features will now be described with reference to the figures to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

There is provided a system and method (referred to as "network service (NS) dimensioning method"), which include a tailoring step to meet the capacity requirements specified in the network service requirements (NSReq). The NS dimensioning method selects an appropriate Virtual Network Function (VNF) deployment flavor for each VNF in the designed NS and calculates the number of VNF instances required of each VNF in the NS with the requested capacity, i.e. dimensioning the NS. Thus, an NS deployment flavor is created or adjusted, which is tailored for the capacity requested and defined through the non-functional requirements (NFR). The NS dimensioning method includes four steps: Propagation Flow Design; NFR Propagation; VNF Dimensioning; and NS Deployment Flavor Tailoring.

The NS dimensioning method disclosed herein generates the deployment parameters for deploying and managing an NS instance of a generic Network Service Descriptor (NSD) for the capacity range requested. These deployment parameters are added to the deployment flavor of the NSD, so that NFV-MANO can use them to provide different levels of capacity spanning from the minimum to the maximum as specified in the non-functional requirements and the NS can be scaled based on these levels.

A prior NS design process generates generic NSDs with a default deployment flavor. The input models for this process include: the NSReq, the NF Ontology (NFO), and the VNF Catalog. The output model is the NS template (i.e., the NSD), which includes parts to describe deployment flavors.

Network Service Requirements. The NSReq is given as a set of functional requirements (FR), architectural requirements (AR), and non-functional requirements (NFR). The NS dimensioning method extends this set with a fourth component: the service access point requirements (SAPR). The NSReq expresses the designer's intent with the network service, e.g. in intent-based networking.

An FR defines a functionality required from the NS to support. An FR may be decomposed into lower level FRs. FRs may have dependency relation between themselves.

An AR defines an architectural constraint for one or more FRs in the sense that those FRs need to be realized by the architecture specified in the AR. Like FRs, ARs also may have decomposition and dependency relations between themselves.

A SAPR is associated with an FR and indicates that the given functionality of the NS and its sub-functionalities are accessible through a single service access point (SAP). The sub-functionalities specified for a SAPR by their name may or may not be part of the FR decomposition specified in the NSReq. In its Accessed Functionality element, the SAPR specifies for each (sub-)functionality on what plane (Data/Control) and in what roles it can be accessed through the SAP.

An NSD designed to satisfy these three requirements (FR, AR, and SAPR) is a generic NSD, as it provides no specific information on the performance or the Quality of Service (QoS) of the network service. Such an NSD is not tailored towards any specific NFRs. Nevertheless, a generic NSD can be onboarded to the NFV-MANO and can be instantiated using the default values, or with values provided in the instantiation request.

The tailoring of an NSD can be done before onboarding based on the NFRs of the NSReq by using additional information elements of the NSD. That is, an NS can have NS deployment flavors (NsDf), which include elements such as the VNF profiles and Virtual Link (VL) profiles. This tailoring process and the use of these profiles are discussed in this disclosure.

The NS dimensioning method takes into account the capacity NFRs for the NS functionalities accessed through SAPs. As a result, an NFR is associated with a SAPR and it expresses some metrics for the accessed functionality (or sub-functionality).

An NFR has three attributes: metric, value, and request size. The metric attribute is of enumeration type, which can have the values of throughput, requests per second (RPS), or maximum concurrent sessions (MCS) as the performance metrics is the focus. The value attribute is numerical, and it expresses the amount requested for the specified metric. The request size attribute is applicable only for the RPS metric as it defines the maximum request size. Thus, the request size attribute also specifies the throughput in an alternative way.

In the NSReq there can be at most one NFR for each metric for each plane of a given functionality. As a result, the RPS and the throughput NFRs cannot be specified together for a given functionality in a given plane. They can be specified for different planes of the same functionality.

Figure 2:
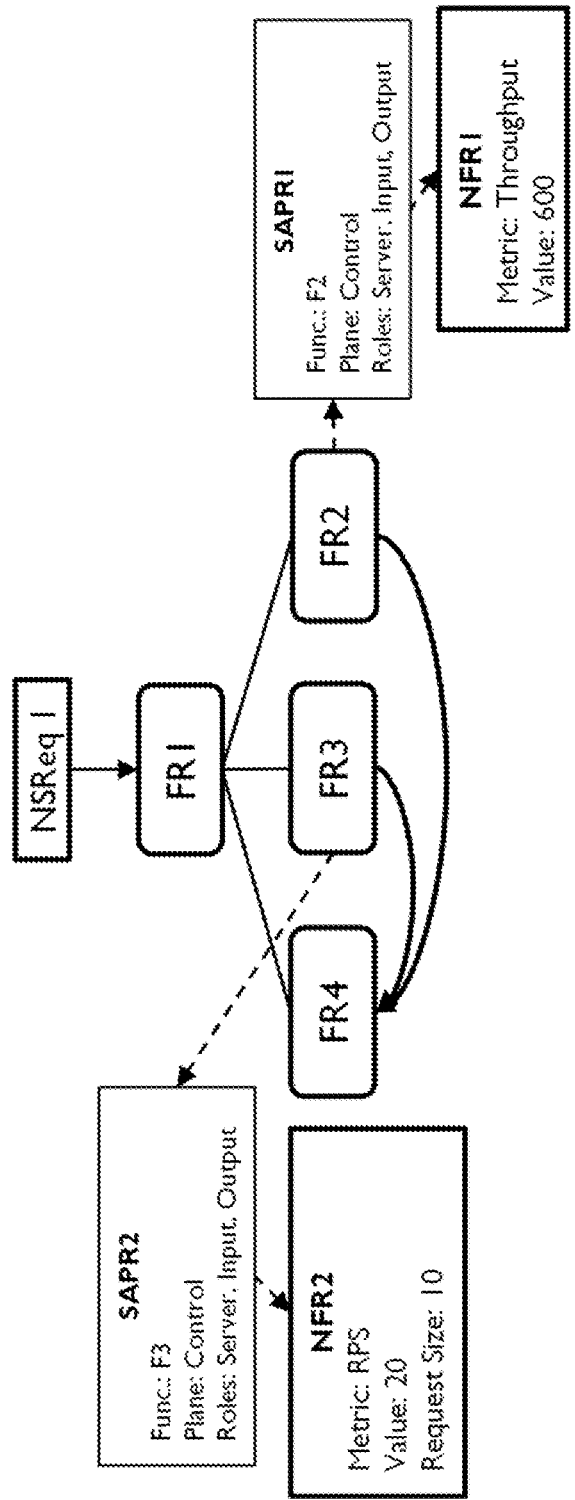
FIG. 2 illustrates an NSReq example.

FIG. 1 illustrates an example NSReq meta-model 100, while FIG. 2 illustrates an NSReq example. In the NSReq example, the root FR (FR1) is decomposed into three other FRs (FR2, FR3 and FR4) with two dependencies between them. Two of the functionalities FR2 and FR3 of the control plane need to be accessible through different SAPs therefore two SAPRs are defined with appropriate NFRs, one for each FR. The first NFR (NFR1) is specifying the throughput for FR2, while the second NFR (NFR2) is specifying the RPS and maximum size for FR3 (this NFR is composite). For readability the NSReq model of FIG. 2 is simplified.

Network Function Ontology and Solution Map. The NFO is a knowledge-base for designing NSs, which contains known functionalities and their valid functional and architectural decompositions with their relations. This information may be used to match the NSReq requested by a tenant to known functionalities and architectures of the NFO, and decompose them further to the point that a set of VNFs can be selected to form the NS functionally satisfying the NSReq. The selection is made from the VNF Catalog, which contains the available VNF packages that can be used to build NSs.

Figure 3A:
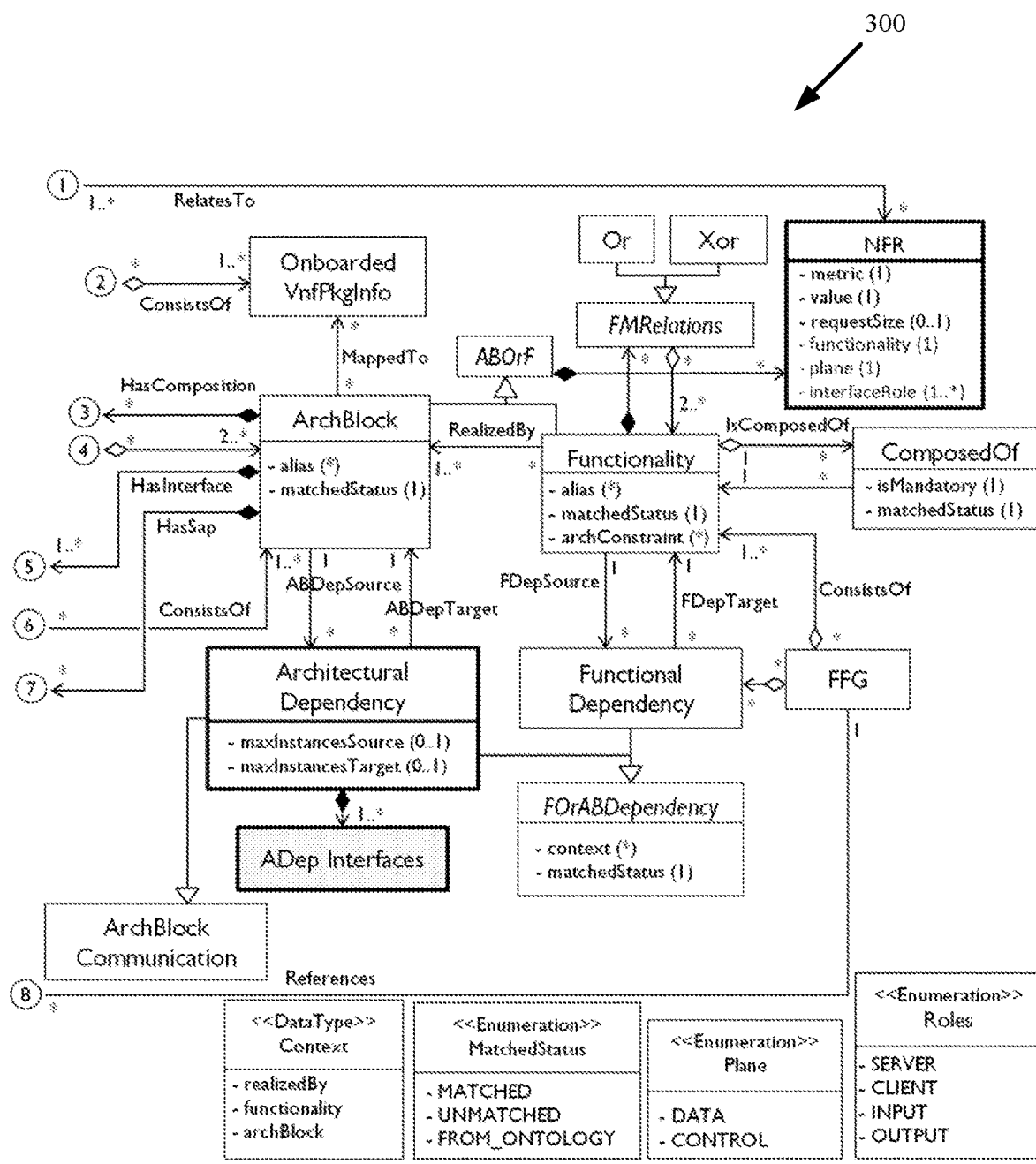
FIGS. 3A and 3B illustrate an example Solution Map (SM) meta-model.
Figure 3B:
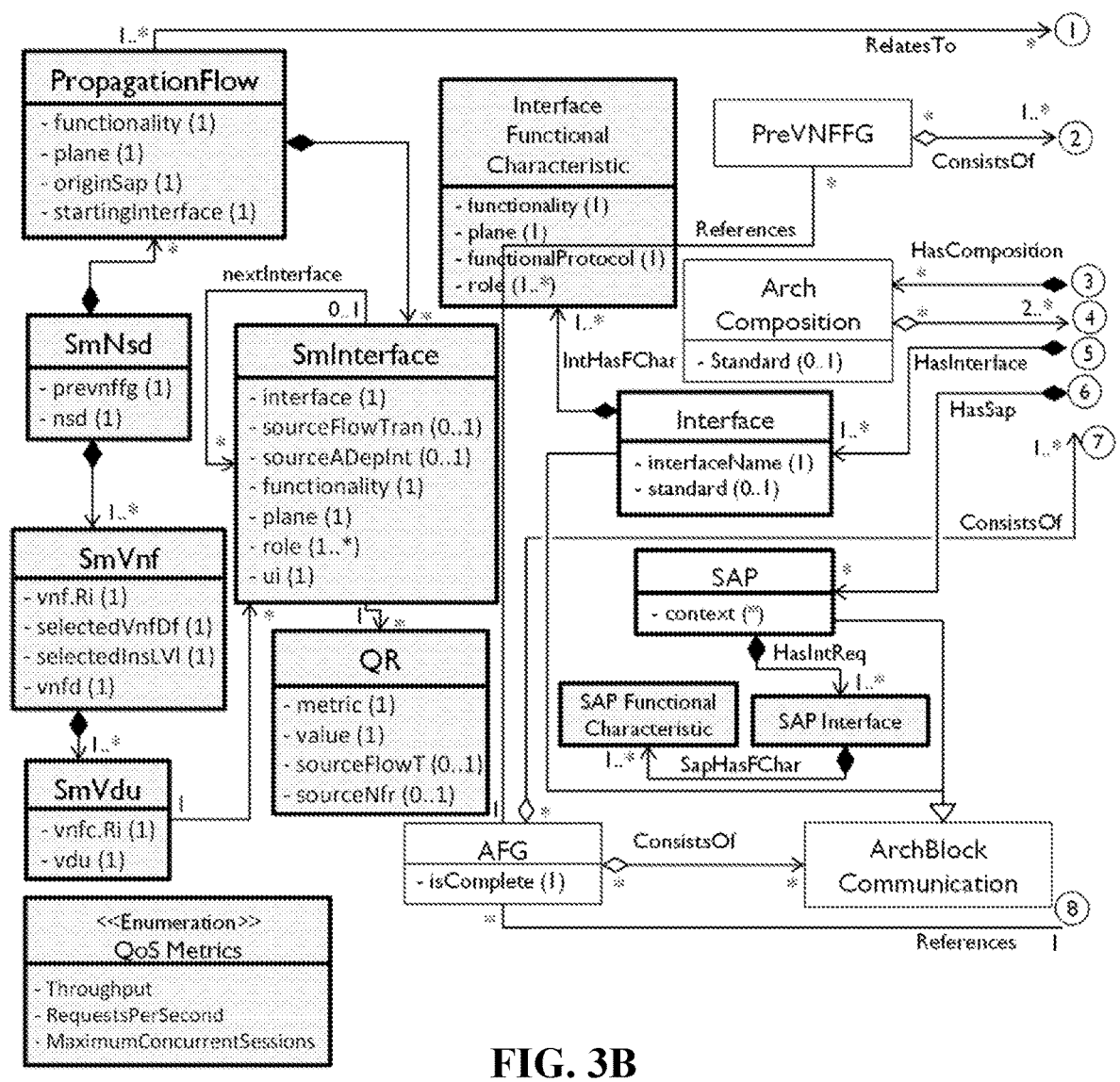

To carry out the NS design process, an intermediary model, the Solution Map (SM), may be used. FIGS. 3A and 3B illustrate an example SM meta-model 300. The SM aggregates all the information gathered from the different input models and includes for the requested NS all the possible decompositions of functionalities and architectural blocks (AB) considering that an AB may realize one or more functionalities and an AB can be implemented as one or more VNFs.

The SM also captures the dependency relations between the functionalities (functional dependency) and between the ABs (architectural dependency).

An AB can have one or more interfaces, each of which defines the plane and the one or more functionalities it exposes on behalf of the AB using a protocol possibly according to some standard. In an NS, one or more interfaces of the ABs can be accessed from the outside world through a SAP. The NS may have one or many SAPs.

Architectural dependencies, AB interfaces and SAPs typically imply communications therefore are considered similar in the SM.

The SM model also captures the mapping of ABs to VNFs and the different types of forwarding graphs (FG) used to generate the VNF forwarding graphs (VNFFG) for the NSD.

These FG types include functional forwarding graph (FFG), architectural forwarding graph (AFG), and Pre-VNF forwarding graph (Pre-VNFFG). An FFG describes the sequence(s) of functionalities in the NS. An AFG identifies the sequence(s) of ABs realizing the functionalities of an FFG. A Pre-VNFFG identifies the sequence(s) of VNFs mapping to the ABs of an AFG. The VNFFGDs of an NSD are created based on the Pre-VNFFG.

Figure 4:
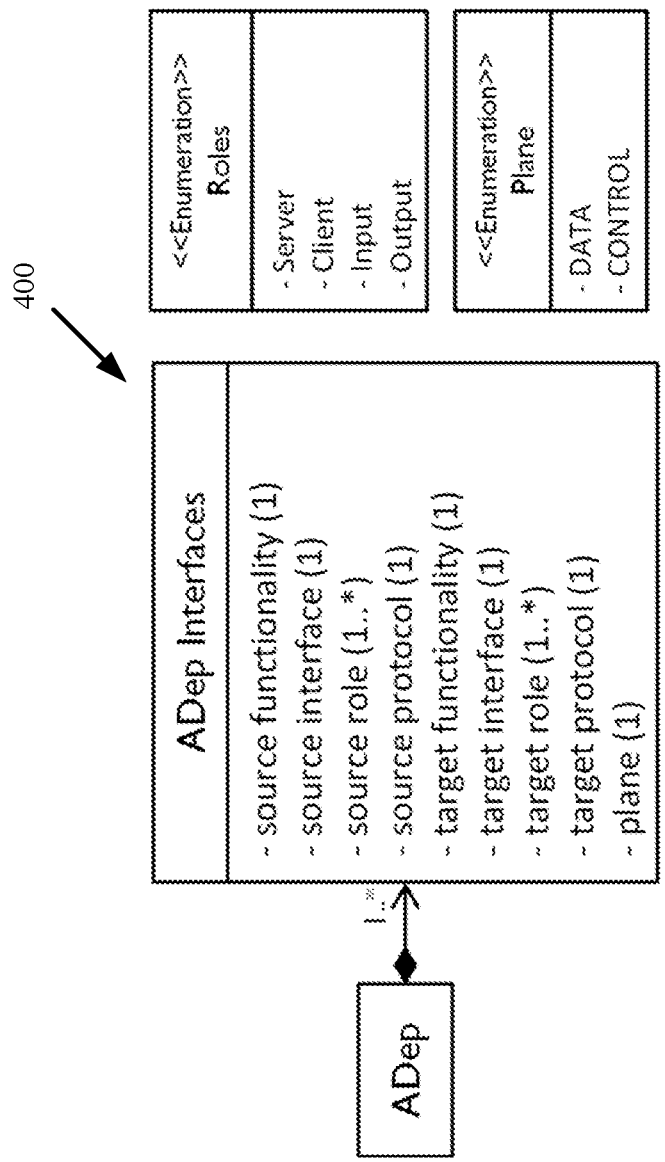
FIG. 4 illustrates an example Architectural Dependency (ADep) Interfaces element.
Figure 5:
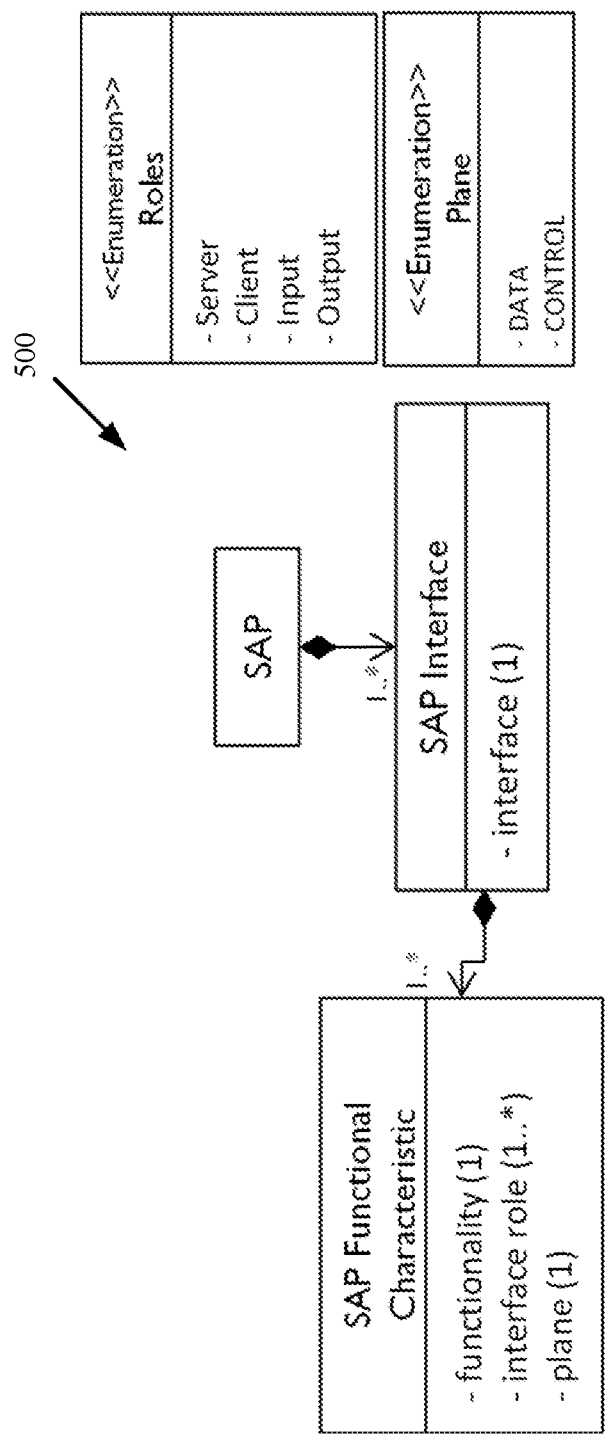
FIG. 5 illustrates an example Service Access Point (SAP) Interface element.

In addition to the discussed elements, the NS dimensioning method extends the SM and the NFO with the following interface information elements (shown in FIG. 4 and FIG. 5).

FIG. 4 illustrates an example Architectural Dependency Interfaces element 400. The Architectural Dependency Interfaces element 400 is associated with the Architectural Dependency (ADep) element of the SM as well as the NFO. It specifies the characteristics of the interfaces of the source and target ABs involved in the communication. More specifically, this element defines the interface, functionality, roles and functional protocol of the source and target ABs, and the plane of the functionalities. For multiple functionalities involved in an architectural dependency, multiple ADep Interfaces element are defined.

FIG. 5 illustrates an example SAP Interface element 500. The SAP Interface element 500 specifies an AB interface to which the SAP is connected. It also indicates the subset of the characteristics of the AB interface related to the communication via the SAP. Its attributes are the reference to the AB interface and to one or more SAP Functional Characteristic element.

VNF Catalog. The VNF Catalog includes the VNF software packages and the VNF Descriptors (VNFD) as defined by the ETSI NFV specifications. In addition to these standard definitions, the VNF Catalog can be extended to include the VNF Architecture Descriptor (VNFAD). The VNFAD can be an information element extending the VNFD or an additional artefact in the VNF package.

VNFD and VNF Deployment Flavor. A VNF delivered by a vendor is described by a VNF Descriptor (VNFD). When such a VNF is deployed, it is deployed according to a VNF deployment flavor (VnfDf). A VNF may have different VnfDfs, each of which is designed for a specific capacity range. The VNF can be scaled within this range. The VnfDf is defined in the VNFD element, and it is based on ETSI standards. The most relevant elements of the VnfDf for the NS dimensioning method are the instantiation level and the Virtualization Deployment Unit (Vdu) profile.

A Vdu is the deployment unit of a VNFC and the Vdu level provides the number of instances for that VNFC. The instantiation level specifies Vdu levels for all the VNFCs used to instantiate the VNF of the given VnfDf. The number of different VNFC instances directly affects the capacity of the VNF. A VnfDf may have different Vdu levels. When the VNF is scaled, its instantiation level changes from one to another defined within the VnfDf.

A Vdu profile provides VNFC tailoring. It specifies the minimum and the maximum for the number of the VNFC instances that can be created from the Vdu for the given VnfDf. These in turn constrain the Vdu levels of the instantiation level. Different Vdu profiles can be selected in different VnfDfs to achieve a given capacity.

Figure 6:
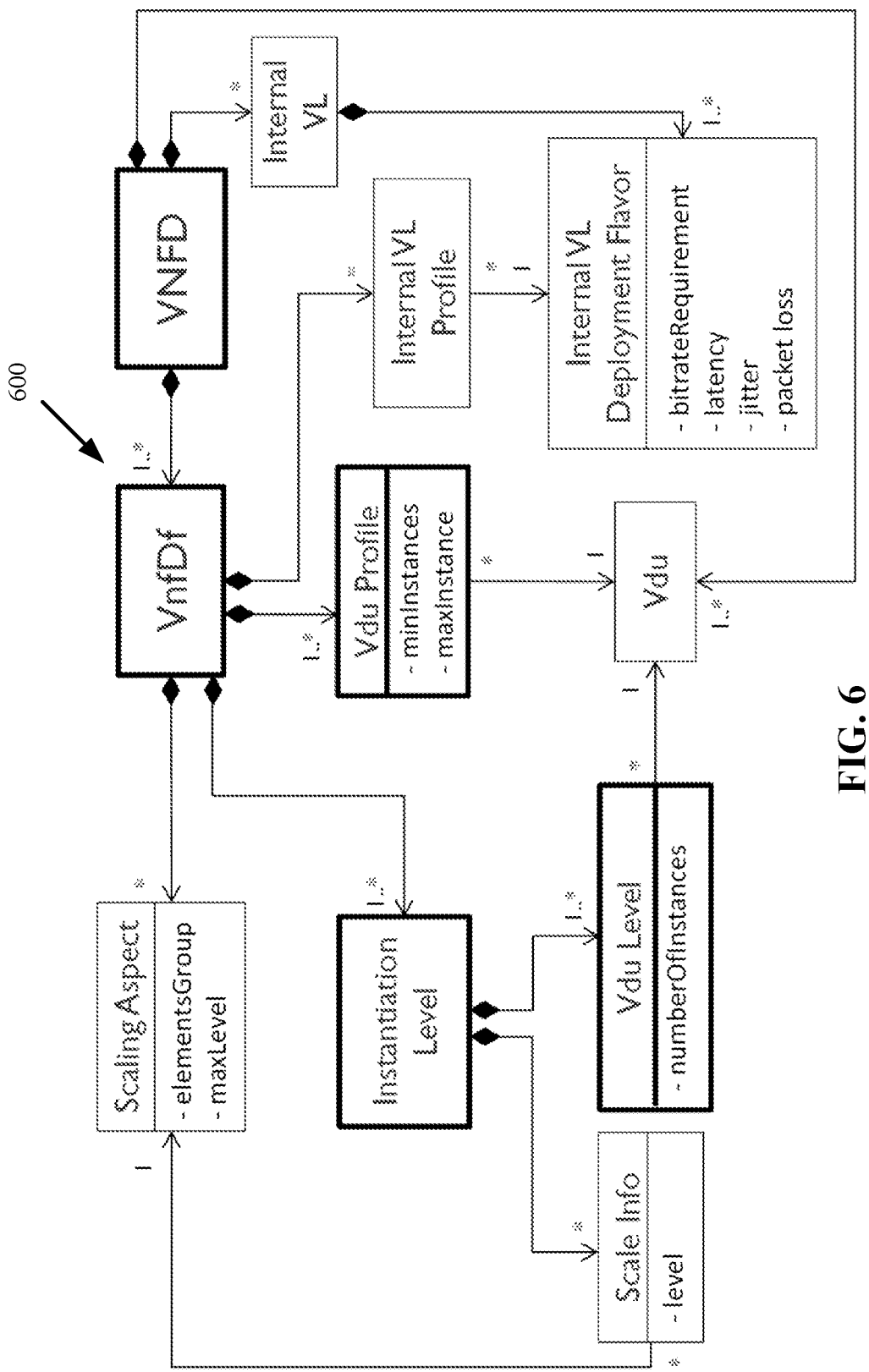
FIG. 6 illustrates a VNF Deployment Flavor (VnfDf) portion of a VNF Descriptor (VNFD) meta-model.

FIG. 6 illustrates a VnfDf portion 600 of a VNFD meta-model. The VnfDf portion 600 contains additional elements such as affinity/anti-affinity rules for the VNFCs, internal virtual link profiles, virtual link deployment flavors, and scaling aspects. The elements shown in bold are related to the NS dimensioning method.

VNF Architecture Descriptor. The VNFAD focuses on the aspects of the VNF application, unlike the VNFD which describes the virtualization aspects. The VNFAD provides information about the architectural block(s) the VNF implements, the functionalities the VNF components (VNFC) provide and the VNF interfaces through which they are accessible.

Figure 7:
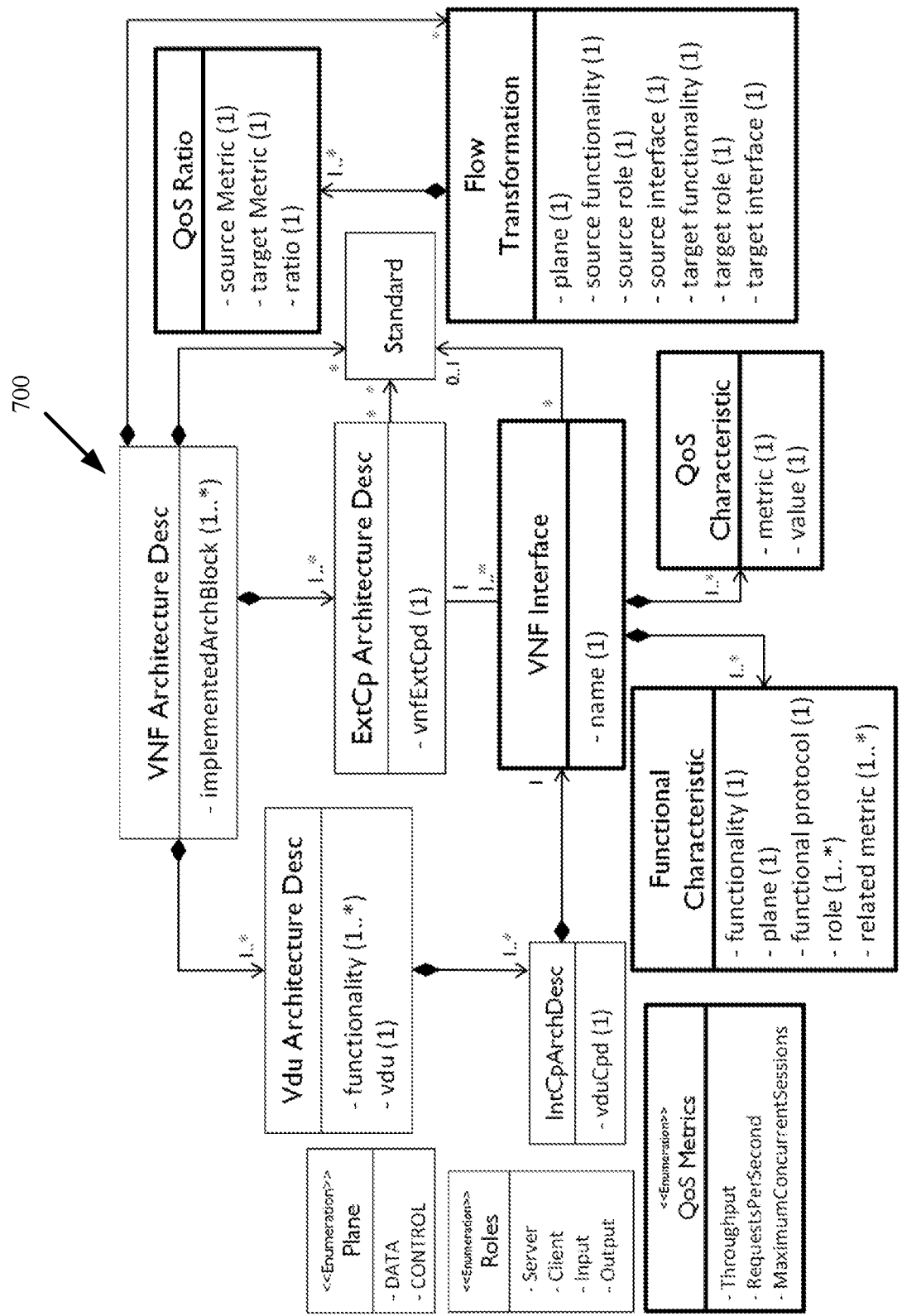
FIG. 7 illustrates an example updated VNF Architecture Descriptor (VNFAD) meta-model.

The NS dimensioning method extends the VNF interface element with the QoS and functional characteristics of the interface. It also extends the VNFAD with the Flow Transformation element, which defines a flow related to a specific functionality within the VNF. FIG. 7 illustrates an example updated VNFAD meta-model 700 (in which the extensions are shown in bold).

VNF Interface. The VNF Interface information element describes an application interface exposed by a VNFC through one of the VNF internal connection points (IntCPs) to the external world. That is, VNF interface is also associated with an external connection point (ExtCP). It is similar to the SAP Interface element.

Each VNF interface has a name and may have a reference to a standard. And each VNF interface maps to an interface of the AB that the VNF implements. The VNF interface associated with an ExtCP determines which functionalities of a VNF can be accessed through that ExtCP and on which plane. Note that the same functionality may be exposed through different interfaces for different planes, and an interface may be exposing multiple planes. The part of a functionality accessible on a given plane is referred to as a functionality plane.

Each functionality plane accessed through the interface is modeled as a Functional Characteristic element. It consists of the name of the functionality and its plane, the protocol used at the application level, the roles the VNF can take in the communication on the given functionality plane (Input, Output, Server, and Client) and the associated metrics. The input and output roles are complementary and can be defined for both data and control planes. The server and client roles are also complimentary, but they can be defined only for the control plane. An interface may have different roles for different functionality planes.

It is assumed that the VNF capacity is compartmentalized in the sense that each VNF interface is associated with a portion of the VNF capacity, which is dedicated to the functionality planes exposed through that interface. These functionality planes share this portion of the VNF capacity, while other functionality planes even of the same functionality cannot access this capacity portion.

The portion of the VNF capacity associated with a VNF interface is described by instances of the QoS Characteristic information element characterizing the volume of traffic that can be processed as it flows through the VNF. It consists of a metric and a value. It may be used for any QoS information, however the NS dimensioning method described focuses on capacity information only. Therefore, the metric (same as the NFR metric) can be throughput, RPS, and MCS. Some of the metrics might not be appropriate for some functionality planes, e.g. if a functionality is not session based the MCS metric is not appropriate to describe its QoS. The VNF interface should have at least one the QoS Characteristic element for each metric listed for each of the functionality planes it exposes. FIG. 7 also illustrates the details of an example VNF interface element.

VNF Flow Transformation. The VNF Flow Transformation element defines the characteristics of a traffic propagation flow inside the VNF. It defines the source and the target VNF interfaces for the flow, their roles and the functionality plane(s). It specifies the transformation of QoS characteristics of the flow from the source interface to the target using the QoS Ratio element.

The QoS Ratio defines the source and target metrics and the ratio of the transformation. Some constraints apply to the QoS Ratio metrics depending on the associated VNF Flow Transformation element. Namely, the throughput metric can only be used for an interface whose role is input or output; and for the RPS and MCS metrics the interface role should be server or client. Therefore, if a propagation flow has both of these QoS Characteristics, then two separate VNF Flow Transformations are specified for it.

The VNF Flow Transformation is able to model flows with bi-directional characteristics. It can also model the response flows related to request flows.

NS deployment flavor. An NS deployment flavor (NsDf) is used to deploy an NS instance. More specifically an NsDf element of the NSD defines NS deployment parameters for specific capacity such as the number of instances for each VNF and their selected VnfDfs. It also provides information on the capacity of the virtual links, NS scaling information, affinity/anti-affinity rules and so on.

Figure 8:
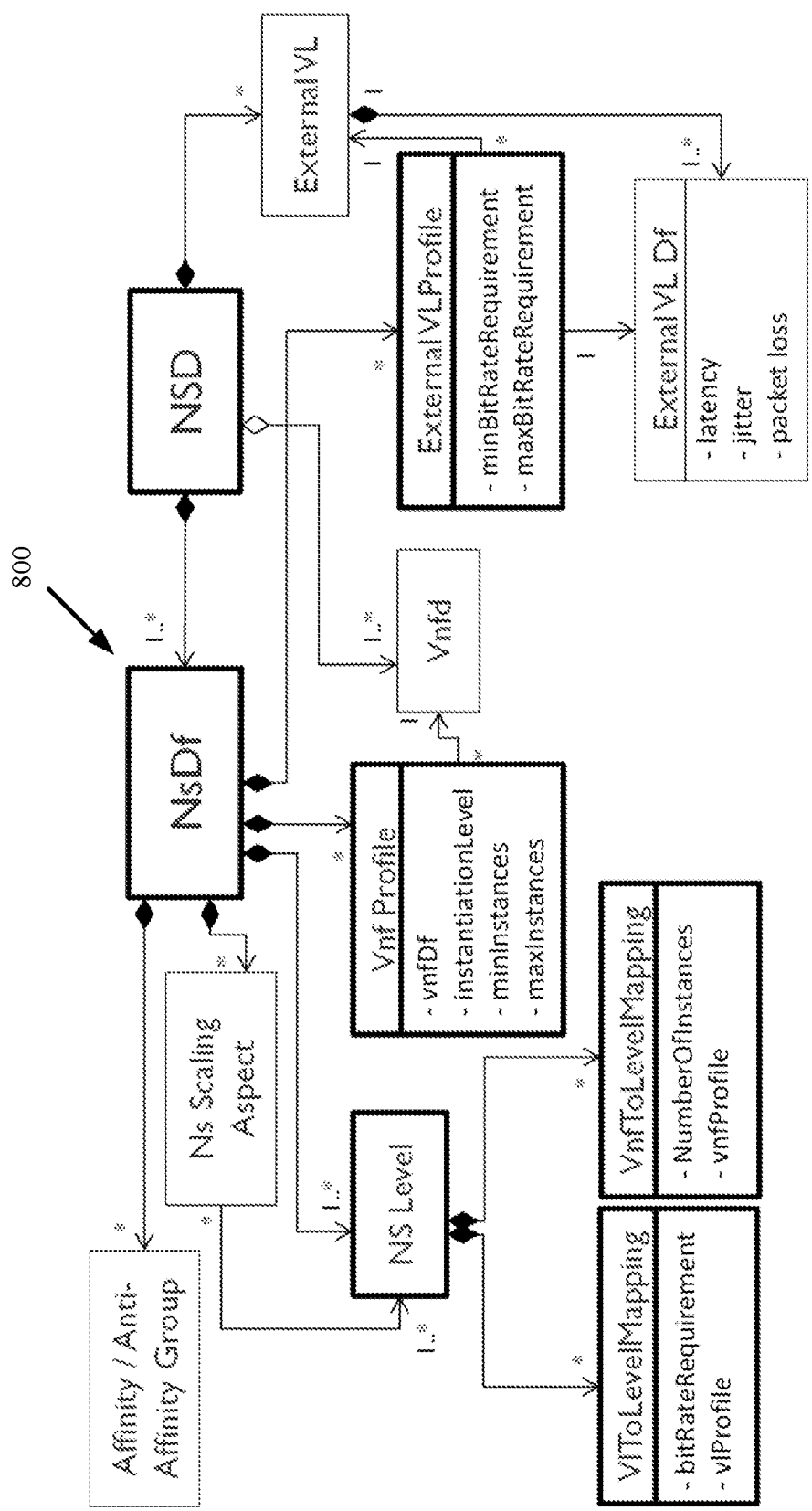
FIG. 8 illustrates a Network Service Deployment Flavor (NsDf) portion of an NSD meta-model.

FIG. 8 illustrates an NsDf portion 800 of an NSD meta-model. The elements of the NsDf portion 800 include: VNF profile, VL profile, NS level, NS scaling aspect and affinity/anti-affinity group. The VNF and VL profiles provide information to tailor the VNFs and VLs. This tailoring information includes the range of their capacity, their number of instances, and other characteristics like affinity/anti-affinity.

An NS Level specifies the number of instances for the VNFs and the capacity for the VLs. The instantiation and the scaling of the NS are based on the NS Levels.

In the process of tailoring the NsDf, a main focus of the NS dimensioning method is on the profiles and NS levels, which are shown in bold in FIG. 8.

As mentioned before, the generic NSD has one NsDf. In the current disclosure, this NsDf is tailored so that it satisfies the capacity spectrum as required by the NFRs.

The NS design process. The NS design process is composed of six main steps: step 1—SM model initialization; step 2—Mapping the SM model to the NFO; step 3—Mapping the SM model to the VNF Catalog; step 4—Generating FGs; step 5—Generating Generic NSDs; and Step 6—Updating NFO.

In step 1 the SM model is initialized from the NSReq model. Thus, the NSReq information is transformed into elements of SM model.

In step 2 the SM model, which at this point contains only the NSReq information, is mapped to the NFO to complement the SM with information existing in the NFO and related to matching elements in SM. This information includes functional and architectural decomposition specified in the NFO related to FRs and ARs of the SM. Based on the SAPRs, the SAP elements are created within the SM model, and then projected to all other functional levels of their decomposition.

In step 3 the ABs of the SM model are matched with the VNFs in the VNF Catalog based on the information they provide on what AB(s) they implement. Using this mapping the VNFs are selected and captured in the SM model.

In step 4, forwarding graphs (FG) are generated considering all possible combinations. Based on the functional decomposition different FFGs are generated considering and combining different levels of the decomposition. By substituting in every FFG the functionalities with their realizing ABs one or more AFGs are generated. Finally, by substituting in every AFG the ABs with the VNFs matched to them one or more Pre-VNFFGs are generated.

In step 5, from each Pre-VNFFG one NSD model instance is created and references to the selected VNFs are added to the NSD according to the given Pre-VNFFG. The VL descriptors (VLD) are created based on the dependencies between the VNFs, i.e. architectural dependencies. An SAP descriptor (SAPD) is created for each SAP in the Pre-VNFFG. Then, for each VNF and for each VL a profile is created to keep their connectivity information. A default NS deployment flavor (NsDf) element is created to reference these profiles. The details of VNF and VL profiles will be discussed in the next section as well as the NsDf element.

In step 6, if applicable, the NFO is enriched based on any new information of the NSReq.

Figure 9:
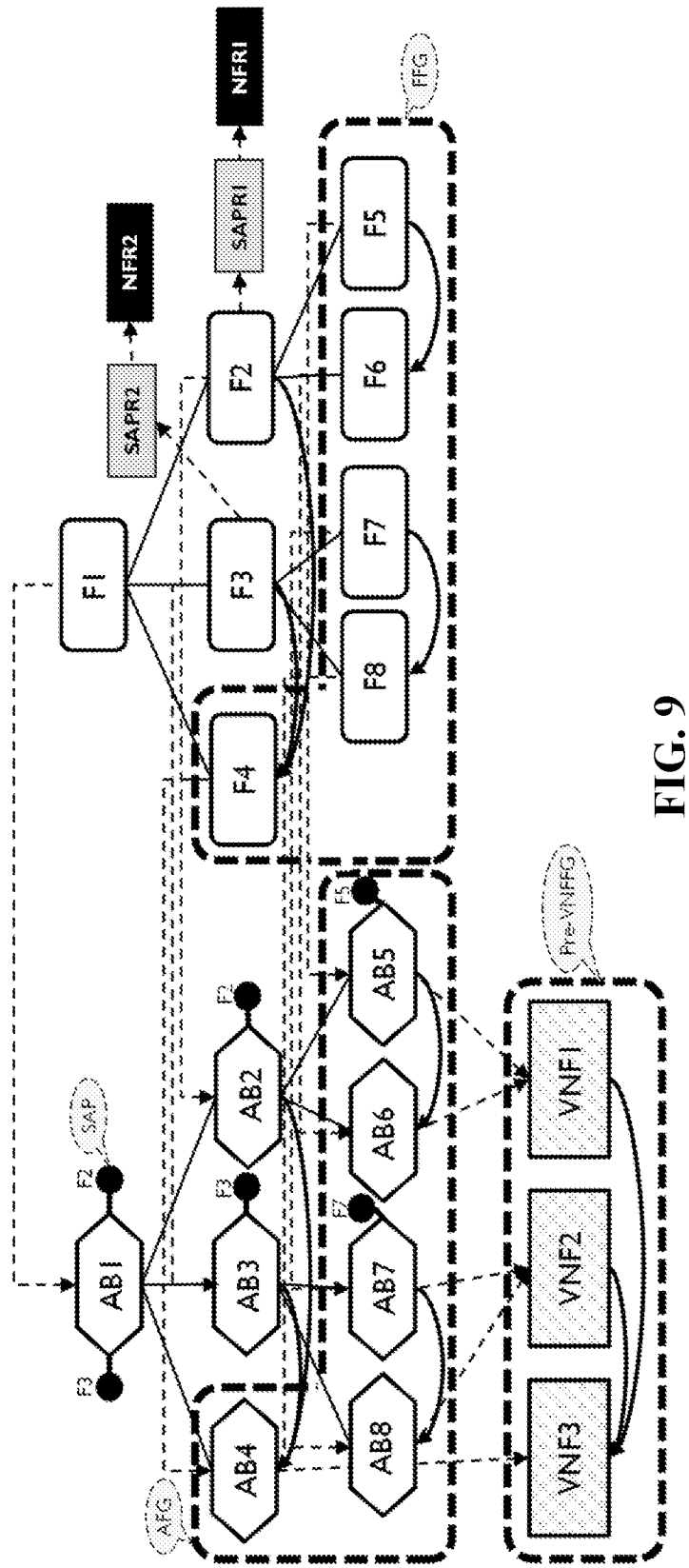
FIG. 9 illustrates a part of an example SM model created through a network service design process to satisfy the requirements in the example of FIG. 2.

FIG. 9 illustrates a part of an example SM model created through the NS design process to satisfy the example NSReq 1 of FIG. 2. In FIG. 9 functionalities are represented by rounded rectangles, ABs by hexagons, and VNFs by rectangles. An SAP exposed by an AB is represented as a black dot attached to the AB. The functionalities exposed through an SAP are listed above the dot.

In FIGS. 9, F2 and F3 of the SM example were mapped to FR2 and FR3 of the NSReq 1. Based on the NFO, F2 and F3 have been decomposed further and the ABs were added. The VNFs were added based on the VNF Catalog. The SAPs of the ABs to be used as NS SAPs were identified based on the SAPRs. From the example SM five FFGs can be generated: {F1}, {F2, F3, F4}, {F5, F6, F3, F4}, {F2, F7, F8, F4}, and {F5, F6, F7, F8, F4}. However, after mapping the functionalities to ABs and VNF implementations, existing VNFs only realize functionalities F4, F5, F6, F7, and F8. Therefore, the first four FFGs were discarded and only the last one remains. As a result, the only AFG is {AB5, AB6, AB7, AB8, AB4}, and the only Pre-VNFFG is {VNF1, VNF2, VNF3}.

Figure 10A:
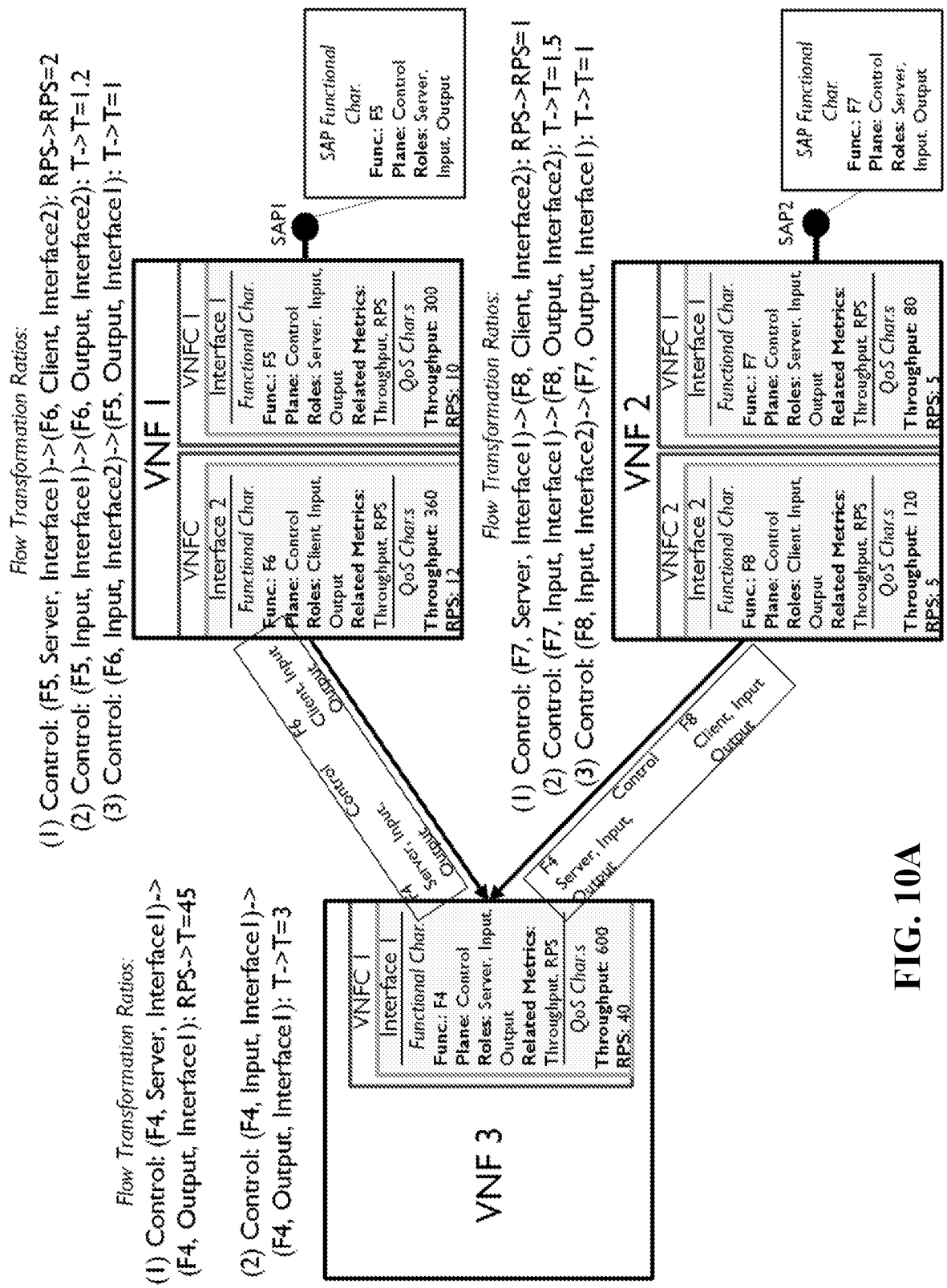
FIG. 10A illustrates a network service example.

FIG. 10A illustrates an NS example, which was designed based on Pre-VNFFG of the SM example model of FIG. 9. It shows the VNFs interconnected with each other according to the architectural dependencies defined in the SM (and the NFO), and the SAPs connected to the VNFs according to SAPRs.

On the arrow representing the architectural dependency the ADep Interfaces elements interface is shown as a rectangle. For example, for the dependency of VNF 1 on VNF 3 it says that the dependency is of the control plane. VNF 1 is involved in the dependency with functionality F6 through interface 2 in the roles of client, input and output. VNF 3, on the other hand, is involved with functionality F4 through interface 1 in the roles of server, input and output.

For each SAP the functional characteristic of the interface is also shown in a box. The functional characteristic of SAP1 shows that it is associated with the control plane of functionality F5 on interface 1, and the roles of the SAP are server, input and output.

FIG. 10A also shows for each VNF the VNFCs and their interfaces according to the VNFADs. Each VNF interface has a Functional Characteristic element and two QoS Characteristic elements. For example, Interface 1 associated with VNFC1 in VNF1 provides access to the control plane of functionality F5, which may be used in server, input and output roles. The VNF capacity accessed through this interface allows for processing up to 300 units of throughput and 10 RPS.

Above each VNF the Flow Transformation elements are shown in FIG. 10A. For example, VNF 1 has three Flow Transformations. The first one (1) defines the control plane flow of functionality F5 from interface 1 in the server role to the control plane of functionality F6 of interface 2, which has the client role. The QoS Ratio for this flow defines that for each request received by interface 1, two requests are sent on interface 2 towards the next VNF.

In the same VNF, Flow Transformation (3) defines a flow in opposite direction to flow (1). It is from F6 on interface 2 to F5 on interface 1 and it has only a throughput characteristic. An example showing a request-response flow is Flow Transformation (1) of VNF 3. It defines that for each request received by F4 on interface 1 as a server, 45 units of throughput are sent out as response on the same interface.

Deployment Flavor Generation. As mentioned before, a generic NSD contains a default NsDf with the connectivity information necessary for deployment. The NsDf of this generic NSD is tailored and the information necessary to satisfy the capacity requirements of the NS requested in the NSReq as NFRs is generated. This requires the dimensioning of the NS and its VNFs. This is achieved by propagating the NFRs of the SAPRs through the VNFs of the NS by means of propagation flows. As part of this propagation, the NFRs are transformed into different capacity requirements applicable to the different VNFs at their interfaces in each propagation flow based on which it becomes possible to dimension the VNFs of the NS.

The inputs for the method are: the generic NSD to be tailored and the SM model used to generate this NSD. The SM model already contains other necessary input, which are the NFRs, the architectural dependencies, the SAP elements and the VNFADs of the selected VNFs. If the SM is not available this information can be recreated based on the NSReq, the NFO and the VNFAD.

Figure 11:
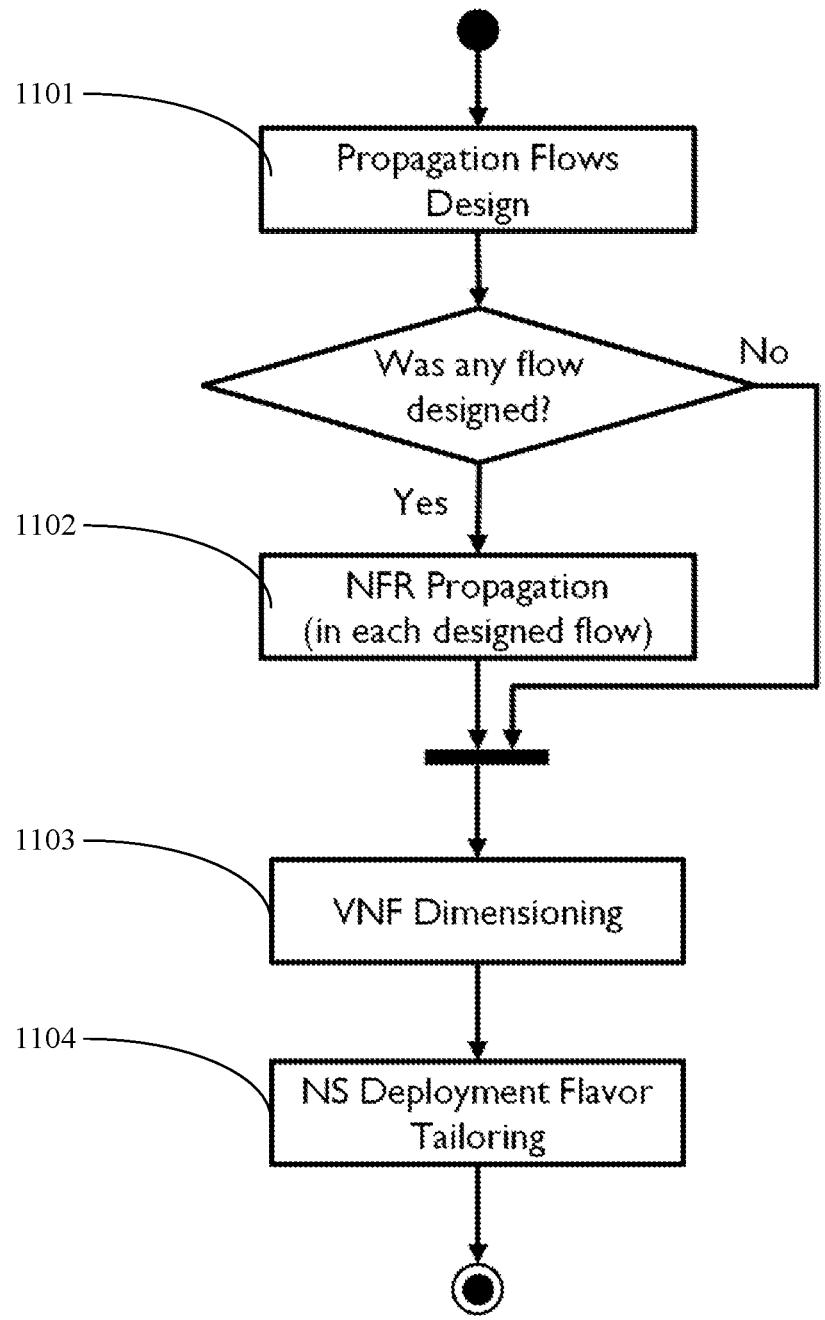
FIG. 11 is a flow diagram of an example network service dimensioning method.

FIG. 11 illustrates an NS dimensioning method including four steps. The four steps are: Step 1101—propagation flow design, Step 1102—NFR propagation, Step 1103—VNF dimensioning, and Step 1104—NS deployment flavor tailoring.

In Step 1101, a propagation flow is designed for each functionality plane, which is accessed through an SAP with at least one target NFR. This is performed by finding the sequence of interfaces of the traffic flow originating at the SAP using the SAPR, VNF Flow Transformation and Architectural Dependency Interface elements.

In Step 1102, the NFRs are propagated along their propagation flow by applying the flow transformations at the interfaces. Thus, generating the capacity requirements for the interfaces in the sequence. Based on this the number of VNF interface instances are calculated. If there are no NFRs this step is skipped.

In Step 1103, the VNFCs are dimensioned according to the number of VNF interface instances. This allows the dimensioning of the VNFs and the selection of one of their deployment flavors.

In Step 1104, the capacity information is generated for NsDf. In this process, the VNF and VL profiles existing in the generic NSD are modified, and the NS levels of the NsDf are generated.

Further details on the Steps 1101-1104 are provided below.

Step 1101—Propagation Flow Design. A propagation flow is defined as an ordered sequence of VNF interfaces through which some traffic related to some requested functionality plane passes within the NS. It is used to propagate the NFRs associated with an SAPR, which defines the accessible functionality plane at an SAP.

Since in the NS, an SAP is associated with at least one VNF interface, such an interface becomes the starting interface in the sequence of interfaces of a propagation flow. The rest of the sequence is formed based on the dependencies between the VNFs and the flows within the VNFs according to their Flow Transformation elements.

For designing a propagation flow first, the functionality and plane of the flow is determined. Then, the sequence of interfaces of the flow are identified.

Determining the functionality and plane. Each functionality and plane accessed through an SAP with a target NFR identifies a propagation flow and different NFRs may identify the same flow. Therefore, NFRs are grouped together based on the functionality and plane they target and for each NFR group, a propagation flow is designed so that the NFR group can be propagated in the next step.

The plane of the propagation flow is the same as the target plane of the NFR group. The NFR group target functionality however is not necessarily the same as the functionality of the propagation flow. The reason for this is two-fold: the NFRs associated with an SAP may be associated with sub-functionalities and also the VNFs selected for the NS may not expose the functionality at the same level as the SAP was requested. Thus, it is necessary to find the VNF interface exposing the (sub-) functionality associated with the NFR group.

Considering the tree of functionality decomposition in the SM, the functionality of the propagation flow may be a functionality above (an ancestor) or below (a child) the target functionality of the NFR group. Therefore, the target functionality, its ancestry and its children are checked if they are accessed through an SAP in the NS. The NS dimensioning method only considers those functionalities which are accessed in the same plane as the target plane of NFR group. Because of the nature of the FFG design, only one such functionality exists in the NS and it is associated with an SAP. This functionality becomes the functionality of the propagation flow.

Finding the starting interface of each flow. The SAP associated with the functionality and plane of the propagation flow determines the starting interface. It is the VNF interface which is associated with the SAP and which exposes the same functionality and plane as the functionality and plane of the flow.

In case there is more than one SAP for the functionality and plane, then there is more than one interfaces to select from. In this selection preference is given to interfaces with server or input roles, which means forward propagation with respect to the Flow Transformations and architectural dependencies. An interface with a client or output role is selected only if no other interface is available and it results in a backward propagation.

Thus, the starting interface, and any interface in general, has three characteristics associated with the propagation flow: the functionality, the plane and the role(s); while the propagation flow also has a direction. Note that the roles of the interface associated with the flow at any given point are the subset of the roles of that interface matching the direction of the flow.

Finding the sequence of the interfaces. A propagation flow enters a VNF through an entry interface and exits through an exit interface. Based on an interface, which is already part of the propagation flow, the next interfaces in the sequence are found using the VNF Flow Transformations and architectural dependencies. More specifically, the VNF Flow Transformations are used to find the exit interfaces based on an entry interface using the Finding the next exit interface procedure described below. The architectural dependencies are used to find the next entry interfaces for an exit interface according to the Finding the next entry interface procedure described further below. Since the starting interface of a propagation flow is always an entry interface, the process starts with finding the next exit interface.

Finding the next exit interface. To find the next exit interface(s) for an entry interface, first the VNF Flow Transformations related to this propagation flow are identified. From the VNF Flow Transformations, which have the entry interface either as a source or as a target interface, the NS dimensioning method selects those whose characteristics (functionality, plane and role(s)) match the characteristics of the entry interface associated with the flow in the direction of the flow (e.g. source for forward propagation). With respect to the role, it is enough if the Flow Transformation matches at least one of the roles of the entry interface associated with the flow. All selected Flow Transformations identify the next interfaces of the propagation flow by their interfaces at the opposite end to the matched interface and their characteristics as defined by the Flow Transformations are used to determine the subsequent interfaces for the flow. They will be used to find the next entry interface(s).

If the next exit interface is the same as the entry interface, the associated roles are checked: If the interface has the server and/or input roles on entry and it has the output role on exit, then this means that the VNF is responding to the incoming flow, which means that as a hint the propagation flow needs to stick with the architectural dependency used in the incoming direction. On the other hand, if the interface has the client role on exit, then as a hint the propagation flow needs to avoid the architectural dependency used in the incoming direction.

Finding the next entry interface. The architectural dependencies associated with an exit interface are used for finding the next entry interfaces. Such interfaces are at the other end of the dependencies, belonging to other VNFs in the NS. For each exit interface, the NS dimensioning method selects from its associated dependencies those which match the characteristics (functionality, plane and roles) of the exit interface associated with the flow, also taking into account any hint resulting from the finding the next exit step. The interfaces at the other end of the selected architectural dependencies are the candidate next entry interfaces. However, to maintain the direction of the propagation flow, as a next entry interface, the role of the interface needs to be complementary to the role of the exit interface associated with the flow.

More specifically, in an "ADep Interfaces" element, interfaces at both ends can have multiple and complementary roles. That is, in the dependency, an interface can have the input and the complementary output roles simultaneously and/or the client and the complementary server roles. An interface having complementary roles in a dependency means that propagation flows can be defined in both directions. However, to stay with the direction of the propagation flow, the role of the next entry interface associated with the flow needs to be complementary to the role of the exit interface associated with the flow, thus, this complementary role should be supported by the interface at the other end of the given dependency.

Note that in the process of determining the propagation flow the flow may meet an interface many times. Every time it meets the same interface, the interface is included in the propagation flow and the characteristics of the interface associated with the flow on each inclusion may change depending on the way the interface is used at that point.

Propagation flow example. Applying the propagation flow design to the example of FIG. 10A, the NS dimensioning method first groups the NFRs with the same target functionality and plane. In the SM of FIG. 9 there are two NFRs, i.e. NFR1 and NFR2. NFR1 targets the control plane of functionality F2, and NFR2 targets the control plane of F3. Therefore, there are two NFR groups resulting in two propagation flows. According to FIG. 9 to find the functionality of the propagation flow for the first group (NFR1) F1, F2 and F5 are checked if there is a VNF interface to be used as SAP. VNF1 has an interface exposing F5. Similarly, for the second group (NFR2) F1, F3 and F7 are checked and VNF2 is found exposing F7. Therefore, the functionality of propagation flow 1 is F5 and of flow 2 is F7. The plane of both flows is control.

Accordingly, the first flow is matched with the SAP1 as shown in FIG. 10A, which is connected to VNF1-interface1 whose functionality, plane and roles match as well. Therefore, the starting interface for flow 1 is VNF1-interface1 and for forward propagation the server and input roles are associated with the flow. Flow 2 is matched with SAP2, and its starting interface becomes VNF2-interfacet similarly with the associated roles server and input.

Starting with VNF1-interface1 as entry interface the Flow Transformations of VNF1 are checked in the forward direction to find the next exit interfaces. Flow Transformations 1 and 2 of VNF-1 shown in FIG. 10A have matching interface definitions (Control: F5, server/input, Interfacet). The interface at the opposite side of both Flow Transformations is Interface2 with characteristics: Control: F6, client/output, Interface2. Therefore, the next exit interface in the flow becomes VNF1-Interface2 with the associated characteristics of functionality F6, control plane, and roles client and output.

The next entry interface based on the architectural dependency of VNF1-interface2 is VNF3-interface1 with functionality F4, control plane. Since VNF1-interface2, the exit interface has the client and output roles, the next entry interface VNF3-interface1 is associated with the complimenting server and input roles at the other end of the architectural dependency.

The next exit interface in VNF3 is again VNF3-interface1 based on flow transformations 1 and 2 of VNF3, which match the characteristics of the entry interface of the flow. According to the flow transformations the role of this interface is output, while the functionality and the plane remain the same. This means that the flow is a response to the incoming flow and as a hint it needs to stick with the architectural dependency and interface of the incoming direction. Based on the hint the architectural dependency towards VNF1 is selected from the two dependencies associated with VNF3-interface1. Thus, the next entry interface is VNF1-interface2 again, but with the role of input and functionality F6. This time flow transformation 3 of VNF1 matches the entry interface and it is selected to find the next exit interface. It shows that the next exit interface is VNF1-interface1 with the output role. By this SAP1, the starting point for the flow is reached therefore the propagation flow design is completed for flow 1.

The propagation flow 2 is designed in a similar way. The steps of the design for both propagation flows are summarized in the Table 1 below, where each row represents a propagation flow and each column represents an interface sequence.

TABLE 1

Results for Propagation Flow Design

| | 1 (Starting Interface) | 2 | 3 | 4 | 5 | 6 |
|---|---|---|---|---|---|---|
| 1 | VNF1-Interface1 Func.: F5 Plane: Control Roles: Server, Input | VNF1-Interface2 Func.: F6 Plane: Control Roles: Client, Output | VNF3-Interface1 Func.: F4 Plane: Control Roles: Server, Input | VNF3-Interface1 Func.: F4 Plane: Control Roles: Output | VNF1-Interface2 Func.: F6 Plane: Control Roles: Input | VNF1-Interface1 Func.: F5 Plane: Control Roles: Output |
| 2 | VNF2-Interface1 Func.: F7 Plane: Control Roles: Server, Input | VNF2-Interface2 Func.: F8 Plane: Control Roles: Client, Output | VNF3-Interface1 Func.: F4 Plane: Control Roles: Server, Input | VNF3-Interface1 Func.: F4 Plane: Control Roles: Output | VNF2-Interface2 Func.: F8 Plane: Control Roles: Input | VNF2-Interface1 Func.: F7 Plane: Control Roles: Output |

Step 1102—NFR Propagation. An NFR is propagated along a flow by calculating the capacity requirements for each subsequent interface in the flow. With that the NS dimensioning method is able to calculate the number of interface instances needed for each interface in the flow, which is the output of this step.

The NFR propagation process is performed for each propagation flow separately and the capacity requirements (QR) for each occurrence of each interface in the flow are calculated. This is done by following the order of the interface occurrences in the flow. The first QR is defined based on the NFR of the flow. Each subsequent QR in the sequence is calculated from the QR of the previous interface using the Flow Transformations selected for the flow in the propagation flow design step. A Flow Transformation may change the value and even the metric of the QR. The QR transformation procedure is different depending on whether the interface in question is an entry or an exit interface.

Calculating the QRs for an entry interface. The QRs of an entry interface is exactly the same as the corresponding QRs of the previous exit interface in the propagation flow. The starting interface has no previous exit interface, but it is connected to the SAP, which is associated with the NFR group for which the propagation flow was designed. These NFRs are used as the QRs for the starting interface. For a composite NFR an additional throughput QR is calculated by multiplying the RPS value and the request size.

Calculating the QRs for an exit interface. The QRs of an exit interface are calculated by transforming the corresponding QRs of the previous entry interface of the propagation flow using the Flow Transformations identified in the propagation flow design step. For each QoS Ratio of a Flow Transformation a QR is created for the exit interface. The metric of the new QR is the same as the target metric of the QoS Ratio in the Flow Transformation. The value of the new QR is the multiplication of QR value of the entry interface by the ratio of the QoS Ratio of the Flow Transformation, or in case of backward propagation by 1/ratio. Depending on the QoS Ratio of the Flow Transformation, each QR of the entry interface may result in zero, one or more QRs for the exit interface. It results in zero QR if there is no applicable QoS Ratio given in the Flow Transformation.

Whenever a flow passes through an interface it uses some capacity or bandwidth of that interface. This used bandwidth is equivalent to the QRs associated with the interface for its given occurrence in the flow. On the other hand, the available bandwidth of an instance of a VNF interface is described by the associated QoS Characteristics. Based on these figures the NS dimensioning method can calculate a per-flow occurrence utilization of the interface for each metric called the metric.IU.

The metric.IU is calculated by dividing the QR value of the flow occurrence of the interface for a given metric (i.e. used bandwidth) by the value of the VNF interface's QoS Characteristic of the same metric. If an interface has no QoS Characteristic for a given metric, the QR is dismissed as this means that this metric is not relevant to the functionality provided through the interface.

Once the metric.IUs have been calculated for all applicable metrics, the maximum among them is considered as the overall instance utilization (IU) for that interface occurrence. The reason of selecting the maximum is that the different QRs of an interface occurrence describe the same load on the interface, but by different metrics.

The summation of all IUs for all of the occurrences of an interface in all flows results in the total instance utilization of that interface in the NS, i.e. total.IU. The total.IU is used in the next step for dimensioning the VNFCs. The NS dimensioning method calculates the total.IU for all of the interfaces of the NS involved in any flows.

The following Table 2 summarizes for the example of FIG. 10A the QRs and their metric.IUs for each occurrence of the interfaces in each flow. Based on this table, total.IU for VNF1-Interface) is 9.2 as it is part of flow 1 as the first/starting interface with a metric.IU=2 and as the sixth exit interface with a metric.IU=7.2. Similarly, for VNF1-Interface2 the total.IU is 8, for VNF2-Interface) is 15.25, for VNF2-Interface2 is 11.5 and finally for VNF3-Interface) 6.8.

TABLE 2

Results for NFR Propagation

| | 1 (Starting Interface) | 2 (exit) | 3 (entry) | 4 (exit) | 5 (entry) | 6 (exit) |
|---|---|---|---|---|---|---|
| 1 | VNF1-Interface1 QR1: Throughput - 600 | VNF1-Interface2 QR1: Throughput - 720 (by Flow Trans. 2) | VNF3-Interface1 QR1: Throughput - 720 | VNF3-Interface1 QR1: Throughput - 2160 (by Flow Trans. 2) | VNF1-Interface2 QR1: Throughput - 2160 | VNF1-Interface1 QR1: Throughput - 2160 (by Flow Trans. 3) |
| | metric.IU 1: 600/300 = 2 | metric.IU 1: 720/360 = 2 | metric.IU 1: 720/600 = 1.2 | metric.IU 1: 2160/600 = 3.6 | metric.IU 1: 2160/360 = 6 | metric.IU 1: 2160/300 = 7.2 |
| 2 | VNF2-Interface1 QR1: RPS - 20 QR2: Throughput - 200 | VNF2-Interface2 QR1: RPS - 20 (by Flow Trans. 1) QR2: Throughput - 300 (by Flow Trans. 2) | VNF3-Interface1 QR1: RPS - 20 QR2: Throughput - 300 | VNF3-Interface1 QR1: Throughput - 900 (by Flow Trans. 1) QR2: Throughput - 900 (by Flow Trans. 2) | VNF2-Interface2 QR1: Throughput - 900 QR2: Throughput - 900 | VNF2-Interface1 QR1: Throughput - 900 (by Flow Trans. 3) QR2: Throughput - 900 (by Flow Trans. 3) |
| | metric.IU 1: 20/5 = 4 metric.IU 2: 200/80 = 2.5 | metric.IU 1: 20/5 = 4 metric.IU 2: 300/120 = 2.5 | metric.IU 1: 20/40 = 0.5 metric.IU 2: 300/600 = 0.5 | metric.IU 1: 900/600 = 1.5 metric.IU 2: 900/600 = 1.5 | metric.IU 1: 900/120 = 7.5 metric.IU 2: 900/120 = 7.5 | metric.IU 1: 900/80 = 11.25 metric.IU 2: 900/80 = 11.25 |

Step 1103—VNF Dimensioning. In this step the NS dimensioning method dimensions the VNFs of the NS by dimensioning their VNFCs, which have at least one of their interfaces involved in at least one propagation flow. To dimension a VNF, its most suitable deployment flavor is selected. To compare the deployment flavors of a VNF, the NS dimensioning method dimensions the selected VNFCs based on the instance utilization of their VNF interfaces that are part of a flow.

VNFC dimensioning. In the dimensioning of a VNFC, the NS dimensioning method calculates the required number of instances (VNFC.RI) of the VNFC to provide the capacity requested.

As discussed earlier, it is assumed that the VNF capacity is compartmentalized and the portion characterized by the QoS Characteristics associated with one interface is separate from other portions. This means that one instance of a VNF and in turn one instance of a VNFC can provide the QoS Characteristics of each of its interfaces simultaneously. Based on this assumption, the number of VNFC instances required (VNFC.RI) is equal to the ceiling of the maximum instance utilization among all of the VNFC interfaces involved in any flow, i.e. ceil(max(total.IUi)), where total.IUi is the total instance utilization of interface i. By selecting the maximum instance utilization among the interfaces, it is certain that the capacity requirement for all the other interfaces with lower total.IU are also fulfilled.

In the example of FIG. 10A, in VNF1 there are two VNFCs with VNF interfaces: VNFC1 has interface 1 and VNFC2 has interface2. The NS dimensioning method calculates a total.IU for VNF1-interface 1:9.2 and for VNF1-interface 2:8. Therefore, VNFC.RI for the VNFC1 is 10, which is ceil (max(9.2, 8)). Similarly, for VNFC2 VNFC.RI is 8. For VNF2, in a similar way, the total.IUs for VNF2-interface1 and VNF2-interface2 are 15.25 and 11.5; therefore VNFC.RI for VNFC1 is 16 and for VNFC2 is 12. For VNF3 the total.IU for VNF3-interface1 is 6.8, and the VNFC.RI for its VNFC1 is 7.

VNF dimensioning. It is assumed that a VNF instance at an instantiation level of a VnfDf can provide a specific performance. Different combinations of the number of VNF instances, its VnfDfs and the instantiation levels can be used to fulfill the same capacity requirements. All these can be considered as solutions. However, depending on the criteria some combinations may be more suitable than others.

This means that to dimension a VNF, the NS dimensioning method calculates the required number of VNF instances (VNF.RI) for the different instantiation levels of the different VnfDfs of the VNF and select the one(s) most suitable.

Number of VNF instances for an instantiation level. For an instantiation level of a VnfDf, the required number of VNFC instances (i.e. VNFC.RI) is compared with the number of VNFC instances in the Vdu level specified by the instantiation level. Their ratio results in the required number of VNF instances for that VNFC. This is referred to as the relative required VNF instances (VNF.RRI) and it is calculated as VNF.RRI=ceil(VNFC.RI/Vdu Level).

Once the VNF.RRI has been calculated for all the VNFCs for the instantiation level, the number of VNF instances can be calculated for that instantiation level.

The VNF.RI of an instantiation level (VNF RIIL) is the maximum of the VNF.RRIs of that VNF VNF.RIIL=max (VNF.RRIVNFCi). That is, VNF RIIL instances of the VNF of the given instantiation level provide the required number of VNFC instances to fulfill the required capacity.

This calculation is repeated for all instantiation levels of all VnfDfs.

Selecting the desirable solution. In this step, the NS dimensioning method selects a VnfDf and its instantiation level as the desirable solution. The criteria used for the selection are the flexibility of scaling and the failure impact. That is, it is preferred to have a VNF which is more flexible to scale and impacted less in case of the failure of its VNFCs, and scaling flexibility is prioritized. Other criteria and/or prioritization can be selected as well.

The first criterion is affected by VNF.RI while the latter by capacity of its VNFCs.

Flexible scaling criterion: in the NFV framework today, all instances of a VNF in a given role are instantiated using the same VnfDf and instantiation level.

The traffic among these instances is load balanced typically, which means that if one VNF instance is scaled all other instances need to be scaled as well. As a result, increasing the number of VNF instances decreases the scaling flexibility since its granularity of scaling increases. For example, if scaling a VNF instance to the next instantiation level results in adding 3 VNFC instances, then scaling two VNF instances adds a total of 6 VNFC instances, three for each VNF instances. Hence, it is preferred to have a smaller number of VNF instances; that is, a smaller VNF.RI. This results in selecting deployment flavors providing more capacity for a single instance.

Failure Impact criterion: The impact of a VNFC failure is related to the VNFC capacity. The less capacity a VNFC has, the less impact its failure has on the NS. Therefore, it is preferred to have a solution with VNFCs of least capacity.

VnfDf instantiation level selection: Based on the first criterion, for each VnfDf, the instantiation level with the minimum VNF.RI is selected as the desirable solution. If there are multiple instantiation levels with the minimum VNF.RI in the same VnfDf, then the one with the minimum total number of VNFC instances is selected as it provides better utilization. For each VnfDf the selected instantiation level is the largest instantiation level necessary to fulfill the NFRs and it can be used in the VNF profile to limit the scaling.

VnfDf selection: To have a final solution for the VNF, it is necessary to select one of its VnfDfs. Applying again the first criterion, the NS dimensioning method selects the VnfDf with the minimum VNF.RI. If there are more than one such VnfDfs, the NS dimensioning method applies the second criterion and selects the one with the maximum total number of VNFC instances as it will have VNFC instances with smaller capacity.

Table 3, FIG. 10B, shows the VnfDfs information for the VNFs in the example of FIG. 10A and the resulting dimensioning. The final solutions for each VNF is enclosed in a solid-line rounded rectangle while other candidate solutions for other VnfDfs are enclosed in dashed-line rounded rectangles.

Dimensioning VNFs without NFRs. As shown previously, the propagation flows are designed based on the NFRs requested by, for example, the tenant. The assumption so far has been that the NFRs are defined in such a way that all VNFs required will be involved in at least one propagation flow and have at least one NFR associated with them. However, it is possible that a VNF referenced by the NSD is not involved in any flow and therefore would not be dimensioned by this time. For such VNFs the default VnfDf and instantiation level provided by the vendor in the VNFD is used and the number of instances (VNF.RI) is set to equal to 1.

Step 1104—NS Deployment Flavor Tailoring. The NsDf is tailored by first tailoring the existing VNF and VL profiles according to the capacity information. Then, all possible NS levels are created to cover the entire range at least up to the capacity requested.

VNF Profile Tailoring. The generic NSD contains a VNF profile for each VNF with the connectivity information with the VLs. These VNF profiles are tailored in this step for each VNF separately.

This means that VNF profile attributes are set according to the selected VnfDf, its selected instantiation level, and the minimum and maximum number of instances. The minimum number of instances is set to 1 and the maximum is set to the VNF.RI calculated in the previous step. As default instantiation level, the NS dimensioning method selects an instantiation level mid-way between the smallest instantiation level of the selected VnfDf and the one that was selected in the previous step. To find the mid-way instantiation level, the instantiation levels of the VnfDf are sorted based on their total number of VNFC instances and the one at the middle of the array is selected.

The process is applied for each VNF profile in the NSD.

VL Profiles Tailoring. The generic NSD also contains a set of VL profiles. In this step the minimum and maximum bitrate requirement attributes of the VL profile are adjusted to the requirements, while other attributes such as delay, jitter, packet loss and service availability are not handled and out of scope for this work.

VL bitrate requirement attribute. As discussed at the section on the VNF interface, a VNF instance is connected to a VL through an ExtCP. The ExtCP is also connected to one or more VNFC instances through their IntCPs. In this respect, the different instances of a VNFC have the same characteristics including their CP bitrate requirements. Therefore, the bitrate requirement of a VL is equal to the total of the bitrate requirements of the connected IntCPs, each multiplied by the number of their VNFC instances. The bitrate requirement of each IntCP is provided in the VNFD in the respective CP descriptor, i.e. VduCpd.

The bitrate requirement of a VL has two attributes: the root and the leaf bitrate requirements. There are three VL types: Line representing a 1:1 connection, Mesh representing a N:M connection, and Tree representing a 1:N connection. The root and the leaf bitrate requirements for different VL types are different, and they are defined in [ETSI. (2018). GR NFV-IFA 015 v3.1.1. Network Functions Virtualisation (NFV) Release 3; Management and Orchestration; Report on NFV Information Model; Annex B] at a high level.

The minimum bitrate requirement for a VL is calculated considering the minimum number of VNF instances (i.e. 1) connected with their minimum instantiation level. The instantiation level determines the number of VNFC instances to be considered on the IntCP side.

For calculating the maximum bitrate requirement, the NS dimensioning method considers the maximum number of VNF instances (i.e. VNF.RI) connected with their maximum (i.e. the earlier selected) instantiation level.

NS Level Generation. Once all the profiles have been generated, the NS levels are created up to the requested capacity so that the NS can be scaled within the requested range. The minimum capacity of the NS is attained when each VNF is at its minimum number of instances which is 1, and the maximum is attained when the number of instances of each VNF is equal to its VNF.RI of the selected VnfDf. Within these ranges, the NS dimensioning method generates each possible permutation as an NS level. Furthermore, the NS dimensioning method also generates the necessary attributes, such as the VnfToLevelMapping element for each VNF and each NS level which gives the number of instances of the VNF for the NS level.

Similarly, for each VL the VirtualLinkToLevelMapping element is created providing the link bitrate requirement for the NS Level. The bitrate requirement for a VL at an NS level is calculated similarly to the bitrate requirements for the VL profile.

A method ("NS dimensioning method") is proposed for dimensioning the VNFs and the VLs of a network service and tailoring its network service deployment flavor (NsDf) based on non-functional requirements (NFR) defined in the network service requirement (NSReq) that are capacity related. The main inputs are the NSReq and the generic NS descriptor (NSD).

The NS dimensioning method starts with the capacity requirements of the NFRs and propagates them through the VNFs of the NS using propagation flows defined as sequences of interfaces. The capacity requirements at the interfaces are transformed to other capacity requirements for the next interfaces of the flow. Once all capacity requirements have been propagated for all the flows, the VNFs are dimensioned based on the requirements. This information is used to dimension the VLs interconnecting the VNFs and the SAPs. Finally, the NsDf is tailored accordingly and the NS levels are generated.

The NsDf tailored in the NS dimensioning method enables the network service to provide different levels of capacity spanning from the minimum to the maximum as specified in the NFRs. The NS can be scaled based on these levels in the NsDf.

Figure 12:
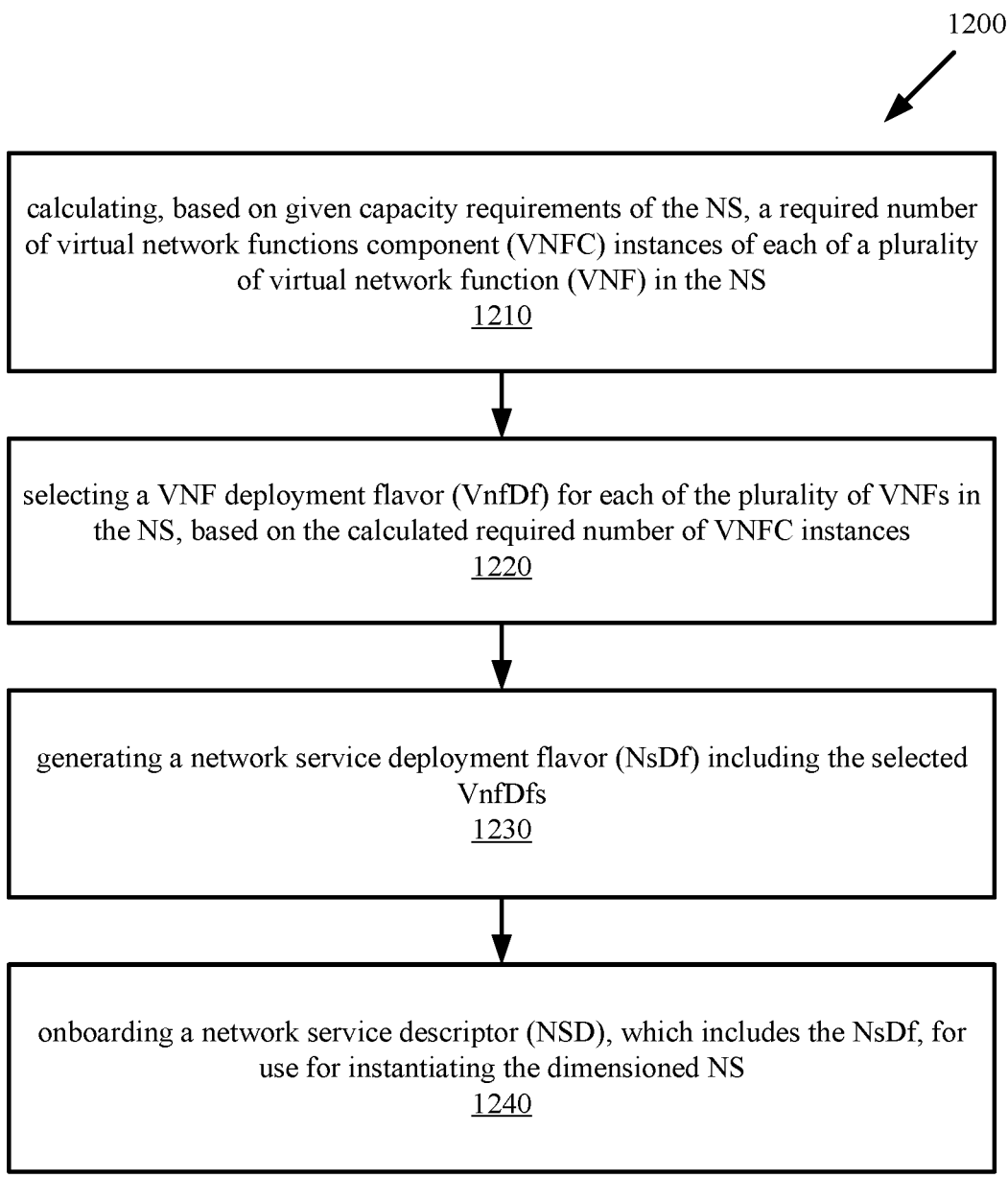
FIG. 12 is a flow diagram illustrating of an example method for dimensioning a network service.

FIG. 12 is a flow diagram of a method 1200 for dimensioning a network service (NS), comprising: calculating, step 1210, based on given capacity requirements of the NS, a required number of virtual network functions component (VNFC) instances of each of a plurality of virtual network function (VNF) in the NS; selecting, step 1220, a VNF deployment flavor (VnfDf) for each of the plurality of VNFs in the NS, based on the calculated required number of VNFC instances; generating, step 1230, a network service deployment flavor (NsDf) including the selected VnfDfs; and onboarding, step 1240, a network service descriptor (NSD), which includes the NsDf, for use for instantiating the dimensioned NS.

In the method, the required number of VNFC instances of each VNF in the NS is equal to a ceiling of a maximum instance utilization among VNFC interfaces involved in any propagation flow within the NS, a propagation flow being an ordered sequence of VNF interfaces through which traffic related to a requested functionality plane passes within the NS.

In the method, selecting the VnfDf for each of the plurality of VNFs in the NS may further comprise selecting an instantiation level for the VnfDf.

In the method, the VnfDf providing a largest capacity for a single instance may be selected; the instantiation level that has a minimum required number of VNFC instances may be selected for the VnfDf; a required VNF instance (VNF.RI) of the instantiation level (VNF RIIL) may be equal to a maximum of relative required VNF instances (VNF.RRI) of the VNF; VNF.RRI=ceil(VNFC.RI/Vdu Level) and VNF.RIIL=max(VNF.RRIVNFCi); and RRIVNFCi means "relative required instances of VNFCi".

The method may further comprise tailoring the NsDf according to the given capacity requirements, wherein tailoring comprises: tailoring a VNF profile for each VNF with connectivity information including virtual links (VLs); setting VNF profile attributes according to the selected VnfDf, the VnfDf selected instantiation level, and a minimum and maximum number of instances, the minimum number of instances being set to 1 and the maximum number of instances being set to required VNF instances (VNF.RI); and creating a plurality of NS levels to cover at least up to the given capacity requirements.

In the method, dimensioning the NS may extend VNF interface descriptors with quality of service (QoS) and functional characteristics of VNF interfaces and may extend VNF architecture descriptors (VNFAD) with flow transformation elements which define flows related to specific functionalities within the VNFs. The functional characteristics may comprise names of the specific functionalities and corresponding planes, protocols used at application level, roles taken by the VNFs in communication on a given functionality plane, and metrics associated with the specific functionalities, the roles taken by the VNFs being selected among: input role, output role, server role, and client role. The input role and the output role are complementary and are defined for both data plane, control plane, or both data and control planes The server role and the client role are complimentary and are defined only for the control plane. Each VNF interface may be operative to have different roles for different functionality planes. The VNFAD may further provide information about architectural block implemented by the VNF, about the specific functionalities provided by the VNFC and about the VNF interfaces through which the specific functionalities are accessible.

The method may further comprise, before the first step, the steps of: receiving as inputs a generic network service descriptor (NSD) to be tailored and a solution map (SM) model used to generate the generic NSD; designing a propagation flow for each of a plurality of functionality planes, which are accessed through a service access point with at least one target non-functional requirement (NFR), by finding a sequence of interfaces of traffic flow originating at the service access point using service access point requirements, VNF flow transformations and architectural dependency interface elements; and propagating NFRs along corresponding propagation flows, by applying VNF flow transformations at VNF interfaces, thereby generating capacity requirements (QR) for the interfaces in the sequence of interfaces.

In the method, designing the propagation flow may further comprise: associating an NFR with a service access point requirement (SAPR) thereby taking into an account capacity NFRs for NS functionalities accessed through service access points (SAPs); and associating an architectural dependency interface element with an architectural dependency (ADep) element of the SM as well with an ADep of a network function ontology (NFO), to specify functional characteristics of interfaces of source and target architectural blocks (Abs) involved in communication on a given functionality plane and to further define functionalities, roles and functional protocols of the source and target Abs as well as planes associated with the functionalities.

In the method, finding the sequence of interfaces may comprise: finding a starting interface defined as a VNF interface which is associated with a service access points (SAP) associated with a functionality and a plane of the propagation flow, and, if more than one SAP is associated with the functionality and plane of the propagation flow, selecting a corresponding interface with a server role or an input role; finding an intermediate sequence of interfaces, wherein a next interface in the sequence of interfaces is found using the VNF flow transformations and architectural dependency interface elements, to identify next entry interfaces based on previous exit interfaces; and finding a final exit interface defined a VNF interface which is associated with as a SAP.

In the method, identifying a next exit interface based on a previous entry interface may comprise: identifying a first VNF flow transformation related to the propagation flow; selecting at most one VNF flow transformation with the functionality, plane and roles matching with the previous entry interface associated with the propagation flow, in a direction of the propagation flow; and identifying the next exit interface by identifying an interface at an opposite end with matching characteristics, as defined by the VNF flow transformations.

In the method, propagating NFRs along corresponding propagation flows, by applying the VNF flow transformations at the VNF interfaces, may be executed for each propagation flow separately wherein the QR for each occurrence of each interface in the propagation flow is calculated.

In the method, the QR for each occurrence of each interface in the propagation flow may be calculated by: calculating a subsequent QR in the sequence of interfaces from the QR of the previous interface, wherein the calculating the subsequent QR is different depending on whether an interface is an entry or an exit interface and comprises: setting a QR of an entry interface to a same value as a corresponding QR of a previous exit interface in the propagation flow; and calculating a QR of an exit interface by transforming a corresponding QR of a previous entry interface of the propagation flow using the VNF flow transformations identified in the propagation flow.

In the method, a quality of service (QoS) ratio may be defined for each VNF flow transformation, and for each QoS ratio, a new QR is created for an exit interface, and the value of the new QR is a multiplication of a QR value of an entry interface with the QoS ratio, or, in case of backward propagation by 1/ratio.

Figure 13:
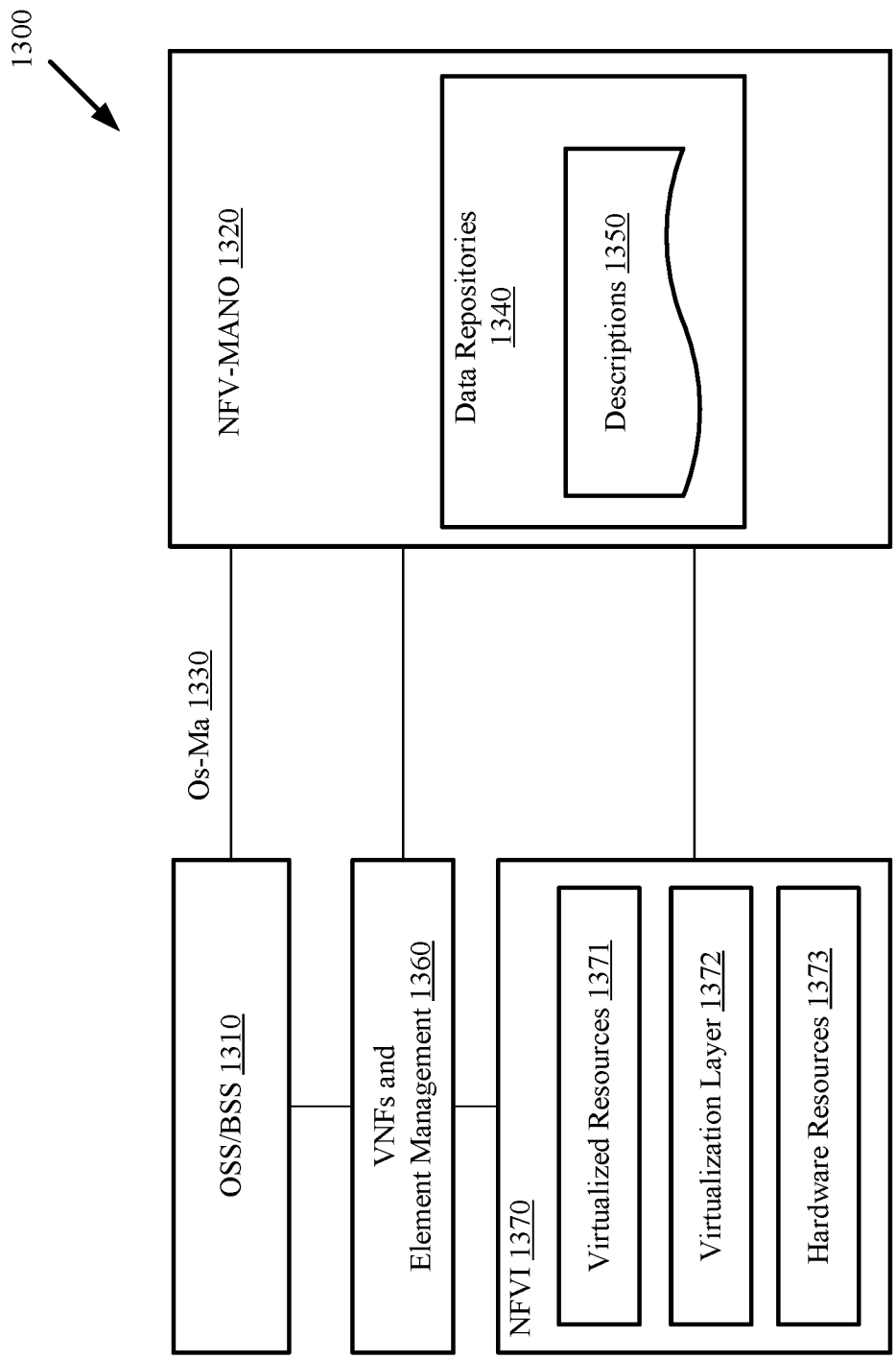
FIG. 13 is a block diagram illustrating an example NFV system framework.

FIG. 13 is a block diagram illustrating an overview of an NFV system framework 1300. After an NSD is generated, an OSS/BSS 1310 may initiate the onboarding of the NSD with an NFV-MANO 1320, e.g. by delivering the NSD via an Os-Ma reference point 1330. The onboarded NSD may be stored in the NFV-MANO 1320, e.g., in data repositories 1340 as part of Descriptions 1350 that include descriptions of service, VNF and infrastructure. The OSS/BSS 1310 may use the same reference point 1330 for communicating with the NFV-MANO 1320 to instantiate an NS instance based on the onboarded NSD.

The VNF Catalog used by the OSS/BSS 1310 for generating the NSD may also be stored in the NFV-MANO 1320 as part of the Descriptions 1350. The network provider or operator, who operates the NFV system framework 1300, onboards the VNFs delivered by a VNF vendor. As part of this onboarding, descriptions of the VNF implementation including the VNFD with the Architecture Descriptor (i.e. the VNF architecture descriptor element 510 of FIG. 5) are delivered to the NFV-MANO 1320 as part of a VNF package containing the implementation and put into the VNF Catalog.

Figure 15:
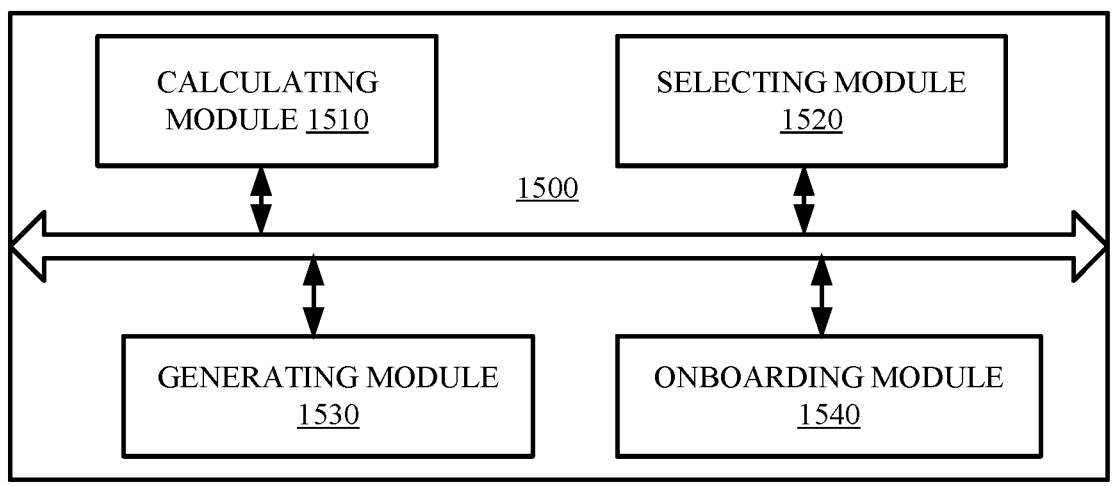
FIG. 15 is a block diagram of another example network node.

The OSS/BSS 1310 may include the modules of FIG. 15 for dimensioning a network service.

The block diagram of FIG. 13 illustrates further details of the NFV system framework 1300, such as an NFVI 1370 including hardware resources 1373, virtualized resources 1371, and a virtualization layer 1372 which abstracts the hardware resources 1373 and decouples the virtualized resources 1371 from the underlying hardware resources 1373. The NFV system framework 1300 further includes VNFs and element management 1360 which manage the VNFs.

Figure 14:
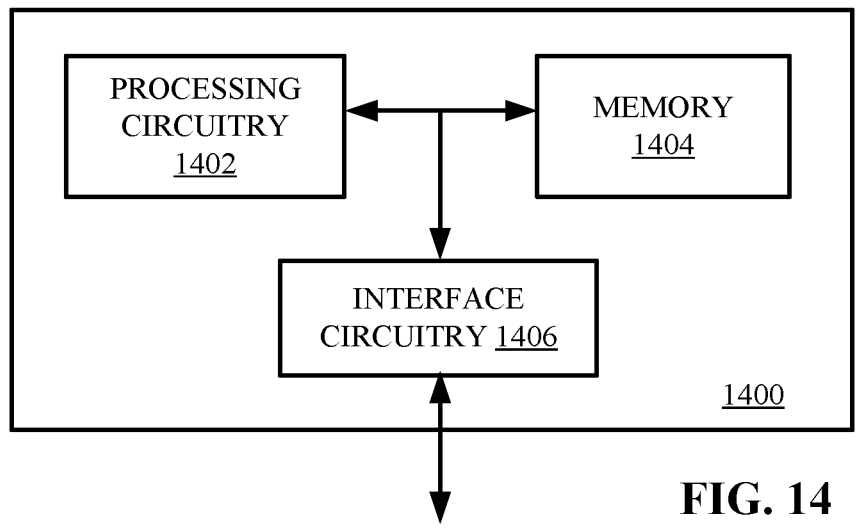
FIG. 14 is a block diagram of an example network node.

FIG. 14 is a block diagram illustrating a network node 1400 which may be a server in an operator network or in a data center. The network node 1400 includes circuitry which further includes processing circuitry 1402, a memory 1404 or instruction repository and interface circuitry 1406. The interface circuitry 1406 can include at least one input port and at least one output port. The memory 1404 contains instructions executable by the processing circuitry 1402 whereby the network node 1400 is operable to perform the various steps described herein.

The network node 1400 is operative to dimension a network service (NS). The network node comprises processing circuits and a memory, the memory containing instructions executable by the processing circuits. The network node is operative to: calculate, based on given capacity requirements of the NS, a required number of virtual network functions component (VNFC) instances of each of a plurality of virtual network function (VNF) in the NS; select a VNF deployment flavor (VnfDf) for each of the plurality of VNFs in the NS, based on the calculated required number of VNFC instances; generate a network service deployment flavor (NsDf) including the selected VnfDfs; and onboard a network service descriptor (NSD), which includes the NsDf, for use for instantiating the dimensioned NS.

The network node may further be operative to select an instantiation level for the VnfDf.

The network node may further be operative to tailor the NsDf according to the given capacity requirements. The network node may be further operative to: tailor a VNF profile for each VNF with connectivity information including virtual links (VLs); set VNF profile attributes according to the selected VnfDf, the VnfDf selected instantiation level, and a minimum and maximum number of instances, the minimum number of instances being set to 1 and the maximum number of instances being set to required VNF instances (VNF.RI); and create a plurality of NS levels to cover at least up to the given capacity requirements.

The network node may further be operative to: receive as inputs a generic network service descriptor (NSD) to be tailored and a solution map (SM) model used to generate the generic NSD; design a propagation flow for each of a plurality of functionality planes, which are accessed through a service access point with at least one target non-functional requirement (NFR), by finding a sequence of interfaces of a traffic flow originating at the service access point using service access point requirements, VNF flow transformations and architectural dependency interface elements; and propagate NFRs along corresponding propagation flows, by applying VNF flow transformations at VNF interfaces, thereby generating capacity requirements (QR) for the interfaces in the sequence of interfaces.

The network node may further be operative to design the propagation flow. The network node may further be operative to: associate an NFR with a service access point requirement (SAPR) thereby taking into an account capacity NFRs for NS functionalities accessed through service access points (SAPs); and associate an architectural dependency interface element with an architectural dependency (ADep) element of the SM as well with an ADep of a network function ontology (NFO), to specify functional characteristics of interfaces of source and target architectural blocks (Abs) involved in communication on a given functionality plane and to further define functionalities, roles and functional protocols of the source and target Abs as well as planes associated with the functionalities.

The network node may further be operative to: find a starting interface defined as a VNF interface which is associated with a service access points (SAP) associated with a functionality and a plane of the propagation flow, and, if more than one SAP is associated with the functionality and plane of the propagation flow, select a corresponding interface with a server role or an input role; find an intermediate sequence of interfaces, wherein a next interface in the sequence of interfaces is found using the VNF flow transformations and architectural dependency interface elements, to identify next entry interfaces based on previous exit interfaces; and find a final exit interface defined as a VNF interface which is associated with a SAP.

The network node may further be operative to identify a next exit interface based on a previous entry interface. The network node may further be operative to: identify a first VNF flow transformation related to the propagation flow; select at most one VNF flow transformation with the functionality, plane and roles matching with the previous entry interface associated with the propagation flow, in a direction of the propagation flow; and identify the next exit interface by identifying an interface at an opposite end with matching characteristics, as defined by the VNF flow transformations.

The NFRs may be propagated along corresponding propagation flows, by applying the VNF flow transformations at the VNF interfaces, for each propagation flow separately. The network node may be further operative to calculate a QR for each occurrence of each interface in the propagation flow. The network node may be further operative to: calculate a subsequent QR in the sequence of interfaces from the QR of the previous interface, wherein calculation of the subsequent QR is different depending on whether an interface is an entry or an exit interface. The network node may be further operative to: set a QR of an entry interface to a same value as a corresponding QR of a previous exit interface in the propagation flow; and calculate a QR of an exit interface by transforming a corresponding QR of a previous entry interface of the propagation flow using the VNF flow transformations identified in the propagation flow.

FIG. 15 is a block diagram of an example network node 1500 adapted to provide a network service to satisfy given capacity requirements according to a network service design that includes VNFs. The network node 1500 includes a calculating module 1510 adapted to calculate, based on the given capacity requirements, a required number of VNFC instances of each VNF in the network service design, a selecting module 1520 adapted to select a VNF deployment flavor based on the required number of VNFC instances, a generating module 1530 adapted to generate a network service deployment flavor including the selected VNF deployment flavor, and an onboarding module 1540 adapted to onboard an NSD, which includes the network service deployment flavor, for instantiating the network service. The network node 1500 can be configured to perform the various steps as have been described herein.

A software product stored in a machine-readable medium (such as non-transitory machine readable storage media, also referred to as a computer-readable medium, a processor-readable medium, or a computer usable medium having a computer readable program code embodied therein) may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform any of the steps described herein. Those of ordinary skill in the art will appreciate that other instructions and operations necessary to implement the described methods and steps may also be stored on the machine-readable medium. Software running from the machine-readable medium may interface with circuitry to perform the described tasks.

There is provided a non-transitory computer readable media having stored thereon instructions for dimensioning a network service (NS), the instructions comprising: calculating, based on given capacity requirements of the NS, a required number of virtual network functions component (VNFC) instances of each of a plurality of virtual network function (VNF) in the NS; selecting a VNF deployment flavor (VnfDf) for each of the plurality of VNFs in the NS, based on the calculated required number of VNFC instances; generating a network service deployment flavor (NsDf) including the selected VnfDfs; and onboarding a network service descriptor (NSD), which includes the NsDf, for use for instantiating the dimensioned NS.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for dimensioning a network service (NS), comprising:
    calculating, based on given capacity requirements of the NS, a required number of virtual network functions component (VNFC) instances of each of a plurality of virtual network function (VNF) in the NS;
    selecting a VNF deployment flavor (VnfDf) for each of the plurality of VNFs in the NS, based on the calculated required number of VNFC instances, and selecting an instantiation level for the VnfDf;
    generating a network service deployment flavor (NsDf) including the selected VnfDfs; and
    onboarding a network service descriptor (NSD), which includes the NsDf, for use for instantiating the dimensioned NS;
wherein the VnfDf providing a largest capacity for a single instance is selected; wherein the instantiation level that has a minimum required number of VNFC instances is selected for the VnfDf; wherein a required VNF instance (VNF.RI) of the instantiation level (VNF.RIIL) is equal to a maximum of relative required VNF instances (VNF.RRI) of the VNF; wherein VNF.RRI=ceil(VNFC.RI/Vdu Level), where VNFC.RI is a required number of instances and Vdu level is a number of instances for a VNFC, and VNF.RIIL=max(VNF.RRIVNFCi), where RRIVNFCi is an acronym for "relative required instances of VNFCi".

2. The method of claim 1, wherein the required number of VNFC instances of each VNF in the NS is equal to a ceiling of a maximum instance utilization among VNFC interfaces involved in any propagation flow within the NS, wherein a propagation flow is an ordered sequence of VNF interfaces through which traffic related to a requested functionality plane passes within the NS.

3. The method of claim 1, further comprising tailoring the NsDf according to the given capacity requirements, wherein tailoring comprises:
    tailoring a VNF profile for each VNF with connectivity information including virtual links (VLs);
    setting VNF profile attributes according to the selected VnfDf, the VnfDf selected instantiation level, and a minimum and maximum number of instances, the minimum number of instances being set to 1 and the maximum number of instances being set to required VNF instances (VNF.RI); and
    creating a plurality of NS levels to cover at least up to the given capacity requirements.

4. The method of claim 1, wherein dimensioning the NS extends VNF interface descriptors with quality of service (QoS) and functional characteristics of VNF interfaces and extends VNF architecture descriptors (VNFAD) with flow transformation elements which define flows related to specific functionalities within the VNFs; wherein the functional characteristics comprise names of the specific functionalities and corresponding planes, protocols used at application level, roles taken by the VNFs in communication on a given functionality plane, and metrics associated with the specific functionalities, the roles taken by the VNFs being selected among: input role, output role, server role, and client role; wherein the input role and the output role are complementary and are defined for a data plane, a control plane, or both the data and control planes; wherein the server role and the client role are complementary and are defined only for the control plane; wherein each VNF interface is operative to have different roles for different functionality planes; and wherein the VNFAD further provides information about architectural block implemented by the VNF, about the specific functionalities provided by the VNFC and about the VNF interfaces through which the specific functionalities are accessible.

5. The method of claim 1, further comprising, before the first step, the steps of:
    receiving as inputs a generic network service descriptor (NSD) to be tailored and a solution map (SM) model used to generate the generic NSD;
    designing a propagation flow for each of a plurality of functionality planes, which are accessed through a service access point with at least one target non-functional requirement (NFR), by finding a sequence of interfaces of traffic flow originating at the service access point using service access point requirements, VNF flow transformations and architectural dependency interface elements; and
    propagating NFRs along corresponding propagation flows, by applying VNF flow transformations at VNF interfaces, thereby generating capacity requirements (QR) for the interfaces in the sequence of interfaces.

6. The method of claim 5, wherein designing the propagation flow further comprises:
    associating an NFR with a service access point requirement (SAPR) thereby taking into an account capacity NFRs for NS functionalities accessed through service access points (SAPs); and
    associating an architectural dependency interface element with an architectural dependency (ADep) element of the SM as well with an ADep of a network function ontology (NFO), to specify functional characteristics of interfaces of source and target architectural blocks (Abs) involved in communication on a given functionality plane and to further define functionalities, roles and functional protocols of the source and target Abs as well as planes associated with the functionalities.

7. The method of claim 5, wherein finding the sequence of interfaces comprises:
    finding a starting interface defined as a VNF interface which is associated with a service access points (SAP)

associated with a functionality and a plane of the propagation flow, and, if more than one SAP is associated with the functionality and plane of the propagation flow, selecting a corresponding interface with a server role or an input role;

finding an intermediate sequence of interfaces, wherein a next interface in the sequence of interfaces is found using the VNF flow transformations and architectural dependency interface elements, to identify next entry interfaces based on previous exit interfaces; and finding a final exit interface defined as a VNF interface which is associated with a SAP.

8. The method of claim 7, wherein identifying a next exit interface based on a previous entry interface comprises:

identifying a first VNF flow transformation related to the propagation flow;

selecting at most one VNF flow transformation with the functionality, plane and roles matching with the previous entry interface associated with the propagation flow, in a direction of the propagation flow; and identifying the next exit interface by identifying an interface at an opposite end with matching characteristics, as defined by the VNF flow transformations.

9. The method of claim 7 wherein propagating NFRs along corresponding propagation flows, by applying the VNF flow transformations at the VNF interfaces, is executed for each propagation flow separately wherein the QR for each occurrence of each interface in the propagation flow is calculated.

10. The method of claim 9, wherein the QR for each occurrence of each interface in the propagation flow is calculated by:

calculating a subsequent QR in the sequence of interfaces from a QR of the previous interface, wherein the calculating the subsequent QR is different depending on whether an interface is an entry or an exit interface and further comprises:

setting a QR of an entry interface to a same value as a corresponding QR of a previous exit interface in the propagation flow; and calculating a QR of an exit interface by transforming a corresponding QR of a previous entry interface of the propagation flow using the VNF flow transformations identified in the propagation flow.

11. The method of claim 9, wherein a quality of service (QoS) ratio is defined for each VNF flow transformation, and for each QoS ratio, a new QR is created for an exit interface, and the value of the new QR is a multiplication of a QR value of an entry interface with the QoS ratio, or, in case of backward propagation by 1/ratio.

12. A non-transitory computer readable media having stored thereon instructions for dimensioning a network service (NS), the instructions comprising:

calculating, based on given capacity requirements of the NS, a required number of virtual network functions component (VNFC) instances of each of a plurality of virtual network function (VNF) in the NS;

selecting a VNF deployment flavor (VnfDf) for each of the plurality of VNFs in the NS, based on the calculated required number of VNFC instances, and selecting an instantiation level for the VnfDf;

generating a network service deployment flavor (NsDf) including the selected VnfDfs; and onboarding a network service descriptor (NSD), which includes the NsDf, for use for instantiating the dimensioned NS wherein the VnfDf providing a largest capacity for a single instance is selected; wherein the instantiation level that has a minimum required number of VNFC instances is selected for the VnfDf; wherein a required VNF instance (VNF.RI) of the instantiation level (VNF.RIIL) is equal to a maximum of relative required VNF instances (VNF.RRI) of the VNF; wherein VNF.RRI=ceil(VNFC.RI/Vdu Level), where VNFC.RI is a required number of instances and Vdu level is a number of instances for a VNFC, and VNF.RIIL=max (VNF.RRIVNFCi), where RRIVNFCi is an acronym for "relative required instances of VNFCi".

13. A method for dimensioning a network service (NS), comprising:

receiving as inputs a generic network service descriptor (NSD) to be tailored and a solution map (SM) model used to generate the generic NSD;

designing a propagation flow for each of a plurality of functionality planes, which are accessed through a service access point with at least one target non-functional requirement (NFR), by finding a sequence of interfaces of traffic flow originating at the service access point using service access point requirements, VNF flow transformations and architectural dependency interface elements;

propagating NFRs along corresponding propagation flows, by applying VNF flow transformations at VNF interfaces, thereby generating capacity requirements (QR) for the interfaces in the sequence of interfaces;

calculating, based on given capacity requirements of the NS, a required number of virtual network functions component (VNFC) instances of each of a plurality of virtual network function (VNF) in the NS;

selecting a VNF deployment flavor (VnfDf) for each of the plurality of VNFs in the NS, based on the calculated required number of VNFC instances;

generating a network service deployment flavor (NsDf) including the selected VnfDfs; and onboarding a network service descriptor (NSD), which includes the NsDf, for use for instantiating the dimensioned NS.

\* \* \* \* \*